United States Patent
Runyon et al.

[11] Patent Number: 5,860,612
[45] Date of Patent: Jan. 19, 1999

[54] GUIDES FOR MAGNETIC TAPE AND METHOD OF MAKING THE SAME

[75] Inventors: John F. Runyon, St. Paul; Robert A. Muehlhausen, Stillwater; Charles L. Dennis, II, Lake Elmo; Leslie M. Milner, Circle Pines; Mark D. Green, Inver Grove Heights, all of Minn.; Keith T. Johnson, Camarillo, Calif.

[73] Assignee: Imation Corp., Oakdale, Minn.

[21] Appl. No.: 795,331

[22] Filed: Feb. 4, 1997

Related U.S. Application Data

[63] Continuation-in-part of Ser. No. 605,244, Feb. 12, 1996, Pat. No. 5,772,143.

[51] Int. Cl.$^6$ .................................................. G11B 23/087
[52] U.S. Cl. ............................................................... 242/346.1
[58] Field of Search ................................. 242/342, 346, 242/548, 548.2, 566, 615, 615.1, 615.2, 615.3, 615.4; 360/130.21, 132

[56] References Cited

U.S. PATENT DOCUMENTS

| | | |
|---|---|---|
| 3,692,255 | 9/1972 | von Behren . |
| 3,889,900 | 6/1975 | Nelson . |
| 4,324,372 | 4/1982 | Majicek et al. . |
| 4,365,769 | 12/1982 | Shoji . |
| 4,534,523 | 8/1985 | Zarr . |
| 5,097,374 | 3/1992 | Koizumi et al. ......................... 360/132 |
| 5,104,058 | 4/1992 | Eggebeen . |
| 5,140,487 | 8/1992 | Tanaka et al. ........................... 360/132 |
| 5,157,833 | 10/1992 | Kohama et al. . |
| 5,173,830 | 12/1992 | Tanaka et al. ........................... 360/132 |
| 5,204,796 | 4/1993 | Koizumi et al. ......................... 360/132 |
| 5,206,781 | 4/1993 | Yanaka ..................................... 360/132 |
| 5,210,670 | 5/1993 | Tanaka et al. ........................... 360/132 |
| 5,299,756 | 4/1994 | Hu et al. . |
| 5,432,668 | 7/1995 | Tanaka ..................................... 360/132 |
| 5,562,258 | 10/1996 | Sato et al. . |

FOREIGN PATENT DOCUMENTS

| | | |
|---|---|---|
| 0450826 | 10/1991 | European Pat. Off. . |
| 2134691 | 8/1984 | United Kingdom . |

OTHER PUBLICATIONS

"Deep Drawing," *Metals Handbook*, 8$^{th}$ Edition, vol. 4, pp. 162–168, 176–180, 252.

Talke, "Investigation of Tape Edge Wear," *Wear*, vol. 17, pp. 21–32 (1971).

*Primary Examiner*—John P. Darling
*Attorney, Agent, or Firm*—Eric D. Levinson

[57] ABSTRACT

A guidance system for tape in a tape cartridge includes two corner guides and an optional third guide. The two corner guides may be angled or tapered to produce a bow or slope in the tape, and to steer the tape. If provided, the third guide is readily adjustable during manufacture to an exact predetermined distance from the two corner guides, thereby avoiding problems due to build-up of manufacturing tolerances. A method of constructing such a system provides an interference fit ferrule on a pin or a nail-like pin as the third guide, such that the position of the ferrule or nail head of the pin can be adjusted to the exact position desired during manufacture.

25 Claims, 17 Drawing Sheets

GUIDES FOR MAGNETIC TAPE AND METHOD OF MAKING THE SAME

RELATED APPLICATION

This is a continuation-in-part of U.S. Pat. application Ser. No. 08/605,244, filed Feb. 12, 1996 now U.S. No. 5,772,143.

BACKGROUND OF THE INVENTION

1. Technical Field

The present invention involves the guidance and positioning of a magnetic tape to assure its travel in a precisely determined tape path past writing or reading transducers.

2. Description of the Related Art

A widely used medium for the storage of magnetically recorded data is the data cartridge. Data cartridges typically have an enclosure containing first and second tape reels, a length of tape wound onto the reels and extending between the two reels, and an opening through which a tape drive can apply one or more transducers to the tape while transporting it between the two reels, so as to record data onto the tape or read data from the tape. A typical mechanism for transporting the tape from one reel to the other includes the use of a transport belt to the outer peripheries of the reels of tape, as disclosed by U.S. Pat. No. 3,692,255 (Von Behren).

It is common practice to write digital data onto recording tapes in rows, or tracks, running in the longitudinal, or tape transport, direction. Improvements in magnetic recording media and in magnetic recording apparatus, particularly improvements in magnetic writing and reading transducers, or heads, have created a trend toward writing data onto tapes in ever narrower and more closely spaced tracks. This has placed increased demands on the apparatus used to find and follow the data tracks, since as data tracks are made narrower and more closely spaced, the increased level of precision required to position a read transducer relative to a data track requires that the path followed by the tape as it passes the head also be more precisely and reproducibly determined.

One arrangement for achieving increased precision in positioning a moving magnetic tape relative to a read or write head is disclosed by U.S. Pat. No. 4,534,523 (Zarr), wherein several guides and wrap pins are used to guide the tape past the head. Each guide and/or wrap pin contacts a major tape surface and has a shoulder which contacts an edge of the tape. The shoulders contact alternating edges of the tape, at longitudinally spaced apart locations, so that the tape is not contacted by two shoulders directly across from one another, on opposite edges, at any one point along the tape. As a result, the spacing between a line passing through any two adjacent edge guide shoulders on one edge of the tape and the edge contacting surface of the guide shoulder intermediate between these two guides on the opposite edge of the tape can be slightly less than the width of the tape, without crushing or otherwise damaging the tape, since the tape is able to negotiate the path between the guide shoulders by traveling in a slightly weaving, or what Zarr calls a "somewhat sinusoidal," path. It has been found that this arrangement for tape guidance, called alternate edge guidance, constrains the tape to travel over a highly reproducible path, while reducing the risk of edge damage to the tape.

Since the spacing between the line through any two edge guiding shoulders on one edge of the tape and the intermediate edge guiding shoulder on the opposite edge of the tape is preferably only slightly less than the width of the tape, the spacing between this line and the intermediate guide must be closely controlled. Zarr does this by press fitting a pin in the base plate of the cartridge, and providing the top edge guide shoulders in the form of split rings which are positioned a fixed distance above the base plate and then crimped or compressed onto the guide pins. The guide pins themselves, along with the bottom guide shoulders, can be produced from solid rod material by screw machine operations. Alternatively, the bottom guide shoulders can be washers or disks captured between the guide pin and the base plate.

While crimped split rings can provide an effective means for edge guidance of magnetic tapes, they suffer from certain limitations, among them difficulty of assembly and limited choice of suitable materials. Installing a split ring onto a guide pin and holding it in a precisely located position while crimping it is a difficult task. The crimping operation involves a significant amount of deformation of the ring, as well as perhaps other parts of the assembly, which can in turn cause movement of the surface of the ring contacting the edge of the tape, thereby increasing risk of variability in the spacing between the edge guiding shoulders between which the tape must pass. The net result is a problematic build-up of tolerances.

An additional complication in installing a split ring onto a tape guide pin is that the split ring must be properly oriented on the guide pin so that the split portion does not contact the edge of the tape, since the split portion may contain burrs or other deformations which could damage the edge of the tape.

A further limitation encountered in the use of crimpable split rings as edge guides is that only a relatively few materials exhibit a suitable combination of mechanical and other properties for use in such an application. In particular, materials used in split rings must be sufficiently malleable to be crimpable without excessive springback, while at the same time exhibiting adequate strength.

Disadvantages also occur in the use of guide pins and shoulders produced by screw machining methods. In particular, producing such parts by screw machine methods places limitations on the materials which can be used, due to the quantity of stock material consumed by screw machine operations. In addition, machining operations are time consuming, and therefore costly. Further, since magnetic tape is sensitive to the surface quality of any surfaces which it contacts, the screw machining operation must be closely controlled in order to assure adequate surface quality, in particular surface smoothness which is in a suitable range. A further disadvantage of tape guides produced by screw machine methods is that they are not readily adjustable after machining. Therefore, the level of precision achievable in an assembled data cartridge will be dependent upon the accumulation of errors in the various components making up the tape guiding assembly.

Alternate edge guidance can also be achieved with only two tape guides, as disclosed in Japanese published patent application JP-130123, wherein two tape guides are slightly offset, so that a straight line path between the two guides is slightly narrower than the width of tape being transported, thereby providing a slight interference. Tape guiding by this means suffers, however, from difficulty of manufacture, since the amount of offset is very small relative to the overall width of the tape, and the two guides must be parallel to within a very small degree of error. This necessitates exceedingly precise insertion and orientation of the guides.

Tape guidance by means of edge contacting guides can produce an additional problem, namely that of variations in tape tension transverse to the tape transport direction. The quality of writing and reading of magnetic tapes depends upon intimacy of contact between the tape and the head, which in turn depends upon the tape tension. It is therefore desirable that the tape tension be uniform across the tape, so as to assure that the tape contacts the head uniformly across its width. When a tape path is modified even slightly by the application of guiding forces applied to the tape edges, transverse variations in tape tension can result in writing or reading errors.

Not only is it desirable to guide recording tape past read and write transducers in a precisely reproducible manner, it is also desirable to precisely guide the tape as it is wound onto the reels, so as to superimpose each strand of tape precisely over the previous strand as it is wound onto the tape pack, thereby producing an evenly wound tape pack which is less likely to cause edge damage to the tape. Evenness of tape guiding may be enhanced by providing additional guides, such as wrap pins 20 and 24 in U.S. Pat. No. 4,534,523 (Zarr). While useful for providing additional tape guidance, these wrap pins add frictional load to the tape drive, as well as adding to the cost of the cartridge.

There is therefore a clear need for precision tape guide components which can be more easily and precisely installed, which present a smooth surface of easily controlled quality to the edges and major surfaces of the tape, and which can be economically produced from materials known to be preferred for tape contacting and guiding applications. Additionally, there is a need for reduced cross-tape variations in tape tension. Finally, there is a need to reduce the number of tape guides or wrap pins contacting the tape, so as to reduce manufacturing cost and frictional drag on the tape.

SUMMARY OF THE INVENTION

The present invention improves tracking and tape tension control through use of two corner guides and a third, intermediate guide between them, all for guiding the tape of a data cartridge as it moves past the transducers of a tape drive. The corner guides and shoulders on the corner guides and the third guide engage alternate edges of the tape as it passes through them.

According a first embodiment of the invention, at least the third guide is formed of a pin and a thin metal shell (or ferrule) having improved surface quality which contacts the edge the tape. Preferably, the corner guides also are formed of such a pin and shell. In a preferred embodiment, the shells are produced by deep drawing of flat metal sheet material into tubular shapes having variable diameters. As discussed further below, according to a further aspect of the invention, precise positioning and orientation of the thin shell components can be achieved by fixturing and adjustment during installation of the components into the tape guiding apparatus, so that there is minimal accumulation of tolerances. In addition, the present invention provides precision tape guidance with reduced cross- or transverse-tape variation in tape tension in the portion of the tape contacting the transducers which write or read information to or from the tape, while allowing a reduction in the number of guides required for adequate guidance of the tape past the head and onto reels.

This structure has the advantage that tape guides can be made of materials having high thermal conductivity. The effects of tape edge overheating and the advantages of using tape guides having a higher thermal conductivity are discussed by F. E. Talke in WEAR, Vol. 17, (1971), pp. 21–32.

The present invention allows use of even somewhat expensive materials, such as beryllium copper, brass, nickel-silver, silicon-nickel bronze, or phosphor bronze, which exhibit relatively high thermal conductivity relative to other metals, and which are known to function well as guide materials for magnetic tapes, to produce edge guides which are still economically feasible to produce for commercial applications, since only small amounts of those materials are needed.

The present invention also allows use of one guide material for contacting major surfaces of the tape and another guide material for contacting the edges of the tape. For example, the guide material which is most suitable for contacting the major surfaces of a magnetic tape may be one having a high thermal conductivity, while the guide material which is most suitable for contacting the edges of the tape may be one having high abrasion resistance.

In an alternative embodiment, a pin with a nail-like head is used as the third guide instead of a pin and metal shell, with the head of the pin serving as the edge guide, and the height of the head adjusted by changing the depth to which the pin is inserted into the baseplate. Preferably according to the invention, the end of the pin being inserted into the baseplate is shaped to reduce the force required to insert the pin into the baseplate as compared to a simple round pin. The corner guides may also be formed of a machined pin, although they would be more similar in structure to a double-headed nail, with the precise positioning of the lower head usually being the critical concern. The precise positioning is most easily achieved with a screw machined part, but it may also be possible to use a cold wire headed part. As discussed further below, according to a further aspect of the invention, precise positioning and orientation of the pin components can be achieved by fixturing and adjustment during installation of the components into the tape guiding apparatus, by-passing the usual problems a machined part has of not being adjustable after machining and thereby minimizing accumulation of tolerances. Although as noted above, precise control of the machining process is required when producing such a pin, it has been found that if such control is exercised, the resulting pin can have even smoother, flatter surfaces than a thin metal shell.

Whether using the shell or pin embodiments, a further aspect of the invention is a method for precise fixturing and adjustment of the relative position of the guide shoulder of one pin with respect to the shoulders of the other pins to minimize the build-up of tolerances. According to this aspect of the invention, a precisely machined bar having a width matching the desired spacing between the shoulders is inserted between the pins. The positions of the pins and/or ferrules then is adjusted so that the guide shoulders all rest against the bar. The bar is then removed, leaving the pins adjusted without the build-up of tolerances usually arising by the conventional method of positioning the components relative to the baseplate rather than each other directly. Note that in most situations, it would be simplest to press the corner guides with the lower shoulders firmly against the baseplate, then simply adjust the position of the third guide, so only one component normally would need to be adjusted.

According to yet another aspect of the invention, the various guides may be inserted at an angle to the baseplate, the baseplate itself may have a portion angled where a guide is inserted and/or the guides may be shaped in a tapered or curved fashion. The net result of such angling is to apply different forces to the top, middle and bottom of the tape. This then adjusts the tension and bow of the tape as it passes the guides.

DETAILED DESCRIPTION OF THE PREFERRED EMBODIMENTS

Figure 1:
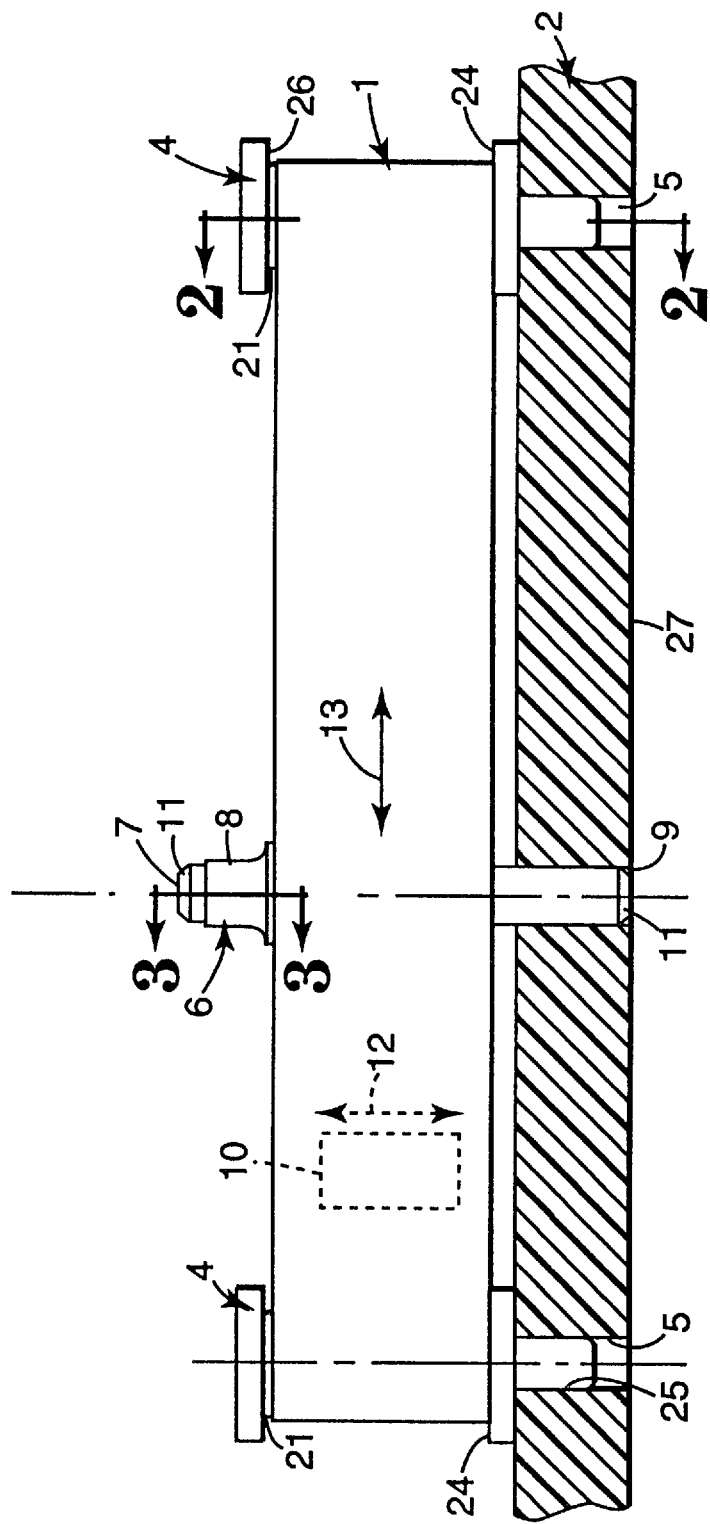
FIG. 1 is an elevational view in partial section of a preferred embodiment of a tape guiding apparatus according to the present invention.

FIG. 1 portrays a guidance system according to the present invention for guiding magnetic tape 1 past head 10 in the forward or reverse longitudinal direction indicated by double headed arrow 13, while precisely maintaining the position of the tape in the transverse direction indicated by double headed arrow 12. The system includes a baseplate 2, main guides 4, and an upper edge guide 6. It is preferred that main guides 4 and upper edge guide 6 be spaced apart longitudinally along tape 1, so that no guide contacts an edge of tape 1 at a point directly transverse across tape 1 from any other guide, thereby guiding tape 1 by alternate edge guidance.

In a preferred embodiment, upper edge guide 6 has a guide pin 7, which holds guide ferrule 8 in a position which is fixed during use, but which can be adjusted during manufacture prior to use. In this embodiment, main guides 4 can be fixedly mounted to baseplate 2 by pressing into holes 5, which are typically of a diameter which provides an interference fit. In like manner, guide pin 7 can be pressed into hole 9, also of a diameter which provides an interference fit. Baseplate 2 may be, but is not limited to being, the baseplate of a digital data recording cartridge wherein tape 1 is transported in directions 13 past head 10 by contacting it with a moving belt of the type commonly used in belt driven data cartridges.

Head 10 may have one or more writing or reading transducers which can record, or write, data onto tape 1 or play back, or read, data which has been previously recorded. Head 10 may be fixedly positioned relative to baseplate 2, or may be able to move in directions 12 for purposes of following possible wandering of data tracks on tape 1, or for selecting particular data tracks on tape 1, in instances where the number of data tracks on tape 1 exceeds the number of individual transducers available on head 10.

Figure 2:
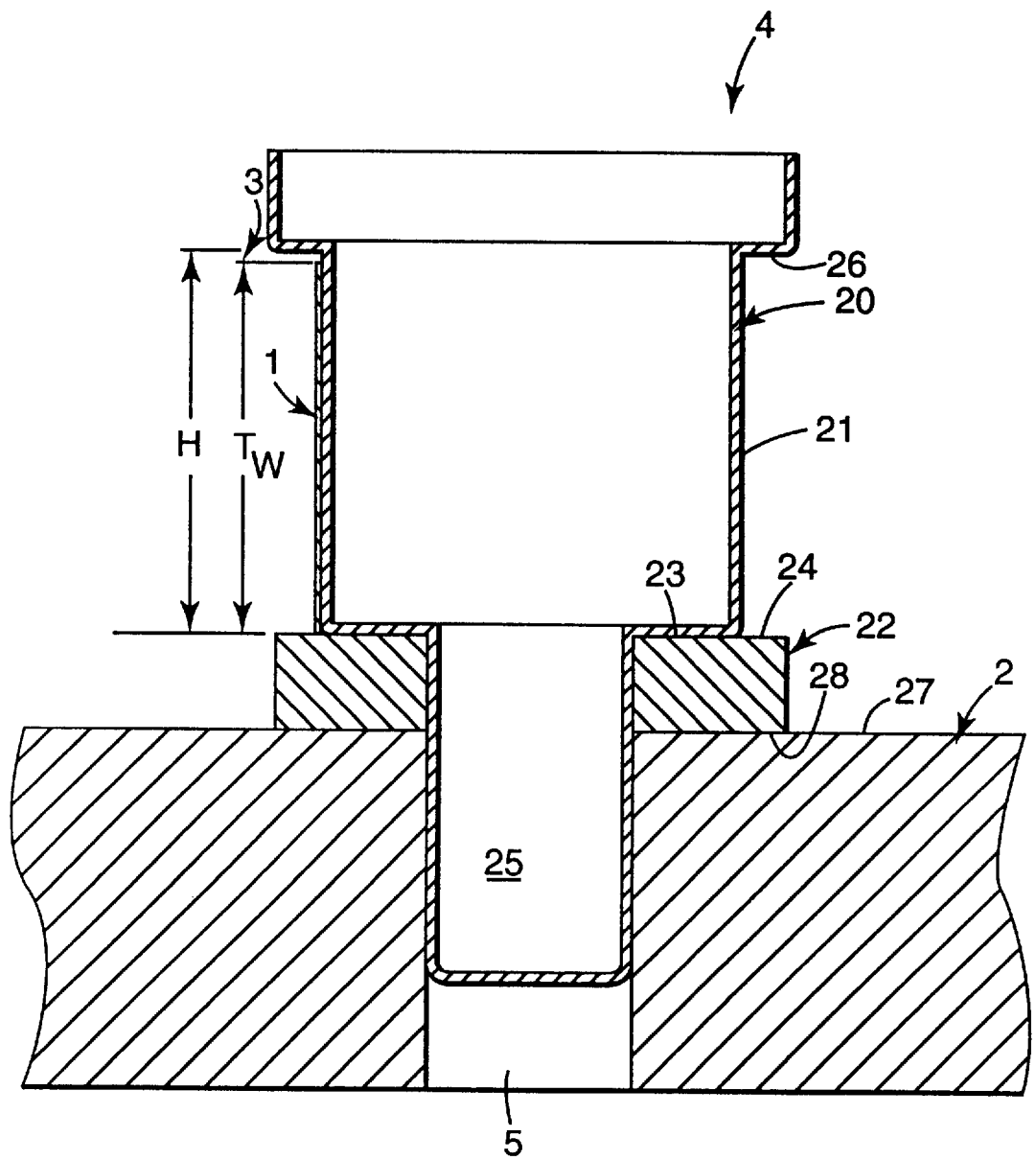
FIG. 2 is a cross sectional view of a first embodiment of a main tape guide post for guiding the lower edge of a magnetic recording tape according to the present invention.

In the embodiment shown in FIGS. 1 and 2, upper edge guide 6 urges tape 1 into engagement with lower edge guide surfaces 24 of main guides 4, so as to constrain the travel of tape 1 to a precisely reproducible path. Referring to FIG. 2, in a first embodiment, main guide 4 is a hollow cylindrical shell 20 and lower edge guide washer 22. Guide 4 is positioned and held in place relative to base plate 2 by post portion 25, which engages hole 5 in baseplate 2 with an interference fit. The strength and alignment of guide 4 can be enhanced by fixedly attaching hollow shell 20 to lower edge guide washer 22 by, for example, adhesive bonding, welding, brazing, soldering, or other like means of attachment prior to insertion of post 25 into hole 5. The strength of guide 4 can be further enhanced by fixedly attaching lower surface 28 of guide washer 22 to upper surface 27 of base plate 2 by adhesive or other bonding means.

To avoid damage to tape 1, during, for example, rough handling of the cartridge when it is being transported or stored, it is helpful to provide upper guide flange 26 on guide portion 21. It is preferred that the distance H between lower tape guide surface 24 and upper guide surface 26 be greater than the tape width TW, so as to assure that gap 3 is present. Flange 26 typically plays little role in tape guidance, but may be a useful precaution against unusual circumstances.

Hollow guide portion 20 preferably is produced by deep drawing of a relatively thin sheet of metal, using, for example, an eyelet machine equipped with suitable dies and other apparatus. The process can involve several drawing, redrawing, reducing, ironing, and other steps well-known in the metal forming art, and described, for example, in METALS HANDBOOK, 8th Edition, Volume 4, pp. 162–181. It is an advantage of the invention that the surface quality produced by such forming operations is more suitable for contact with magnetic tape surfaces than surfaces produced by some machining operations commonly used for tape guide production.

It is a further advantage of this embodiment that guide portion 20 can be chosen to be a material which is most suitable for contacting a major surface of tape 1, for example a metal having especially high heat conductivity, while the material for guide washer 22 can be chosen to be a different material, such as one which is more suitable for contact with the tape edge, for example a material which is more abrasion or wear resistant.

Figure 3:
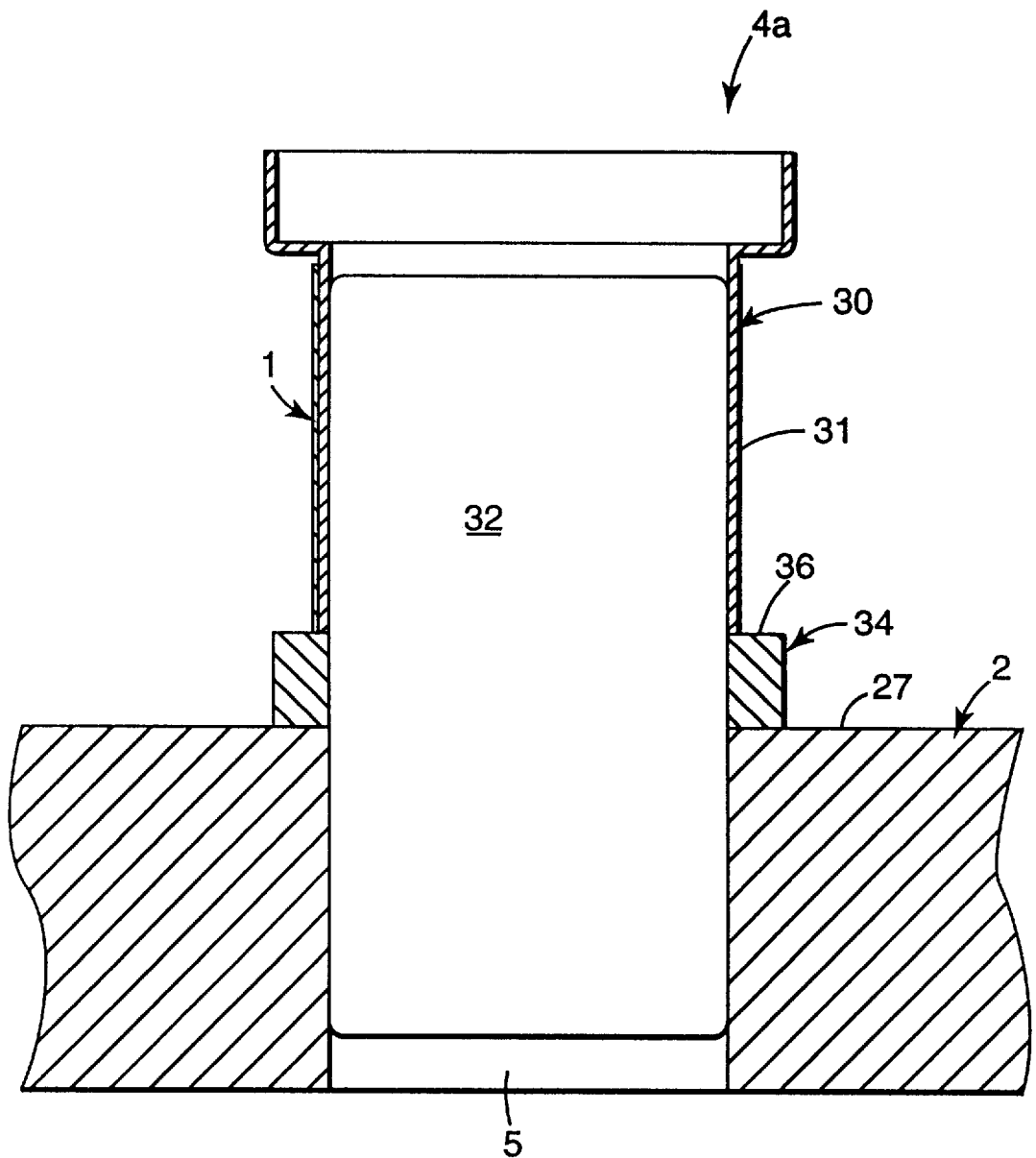
FIG. 3 is a cross sectional view of a second embodiment of a main tape guide post for guiding the lower edge of a magnetic recording tape according to the present invention.

FIG. 3 portrays a second embodiment of a main guide 4a having a hollow guide portion 30, post 32, and lower edge guide ring 34. Post 32 is a solid material, such as steel or other metal, which is inserted into hole 5 of base plate 2 with an interference fit to provide a solid support for lower edge guide ring 34 and major surface guide 31. Lower edge guide ring 34 and major surface guide 31 can be held fixedly in place on post 32 by providing an interference fit between the inner surfaces of these members and post 32. The strength of the assembly may be enhanced by use of adhesive or other suitable bonding agents. It is an advantage of the present invention that different materials can be chosen for hollow guide portion 30, post 32, and guide ring 34.

Figure 4:
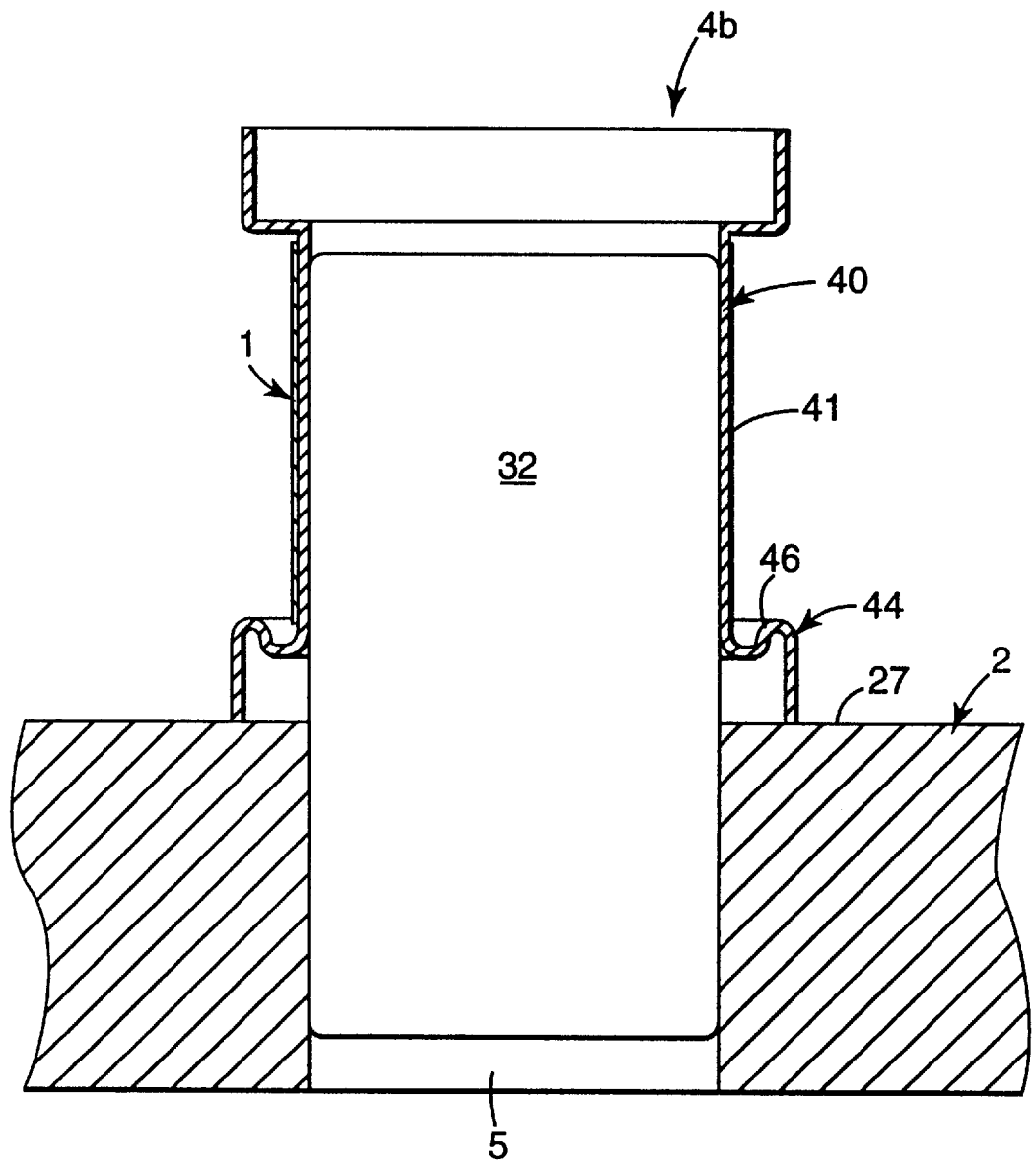
FIG. 4 is a cross sectional view of a third embodiment of a main tape guide post for guiding the lower edge of a magnetic recording tape according to the present invention.

FIG. 4 portrays a third embodiment of a main guide 4b. Main guide 4b is a tubular member 40 having a major surface guide portion 41 and a lower edge guide surface 46, wherein these guide surfaces are held a fixed distance away from upper surface 27 of base plate 2 by bottom portion 44. Guide 40 is fixedly located on base plate 2 by post 32, which is inserted into hole 5 in base plate 2. Post 32 can be slightly larger in diameter than hole 5, so as to form an interference fit. In like manner, tubular member 40 can be slightly smaller in diameter than post 32, to be held in place by an interference fit. Strength and reliability of attachment of post 32 to base plate 2 and to guide 40 can be enhanced by the use of adhesives or other suitable bonding agents.

Figure 5:
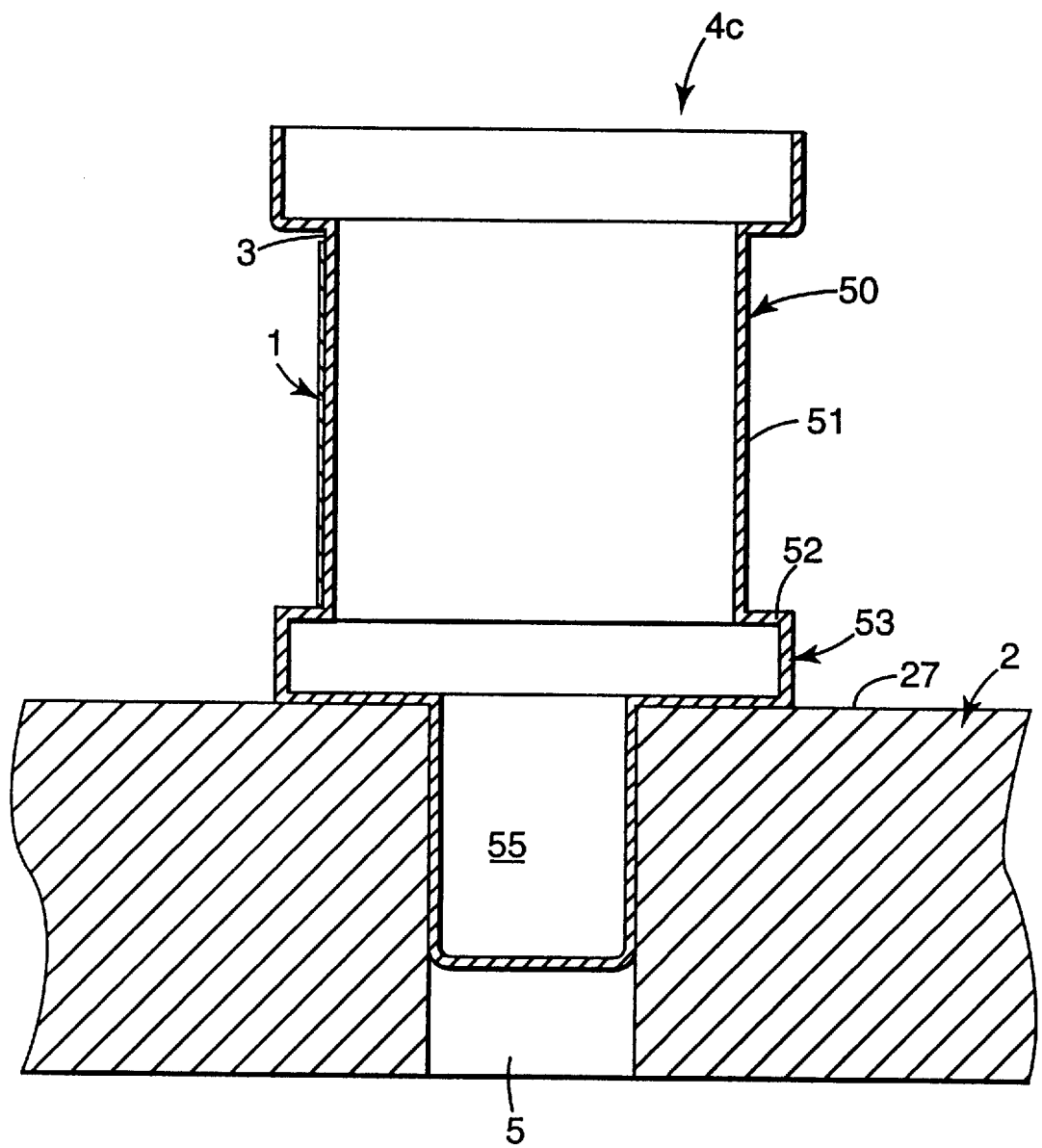
FIG. 5 is a cross sectional view of a fourth embodiment of a main tape guide post for guiding the lower edge of a magnetic recording tape according to the present invention.

A fourth embodiment of a main guide 4c is portrayed in FIG. 5, wherein guide 4c is a single hollow cylindrical member 50 with a major surface guide portion 51, a lower edge guide flange 53 having a lower edge guide surface 52, and attachment post portion 55. Guide 4c is fixedly positioned on base plate 2 by insertion of post portion 55 into hole 5. Strength of attachment of guide 4c to baseplate 2 can be enhanced by adhesive or other suitable bonding agents.

Figure 6:
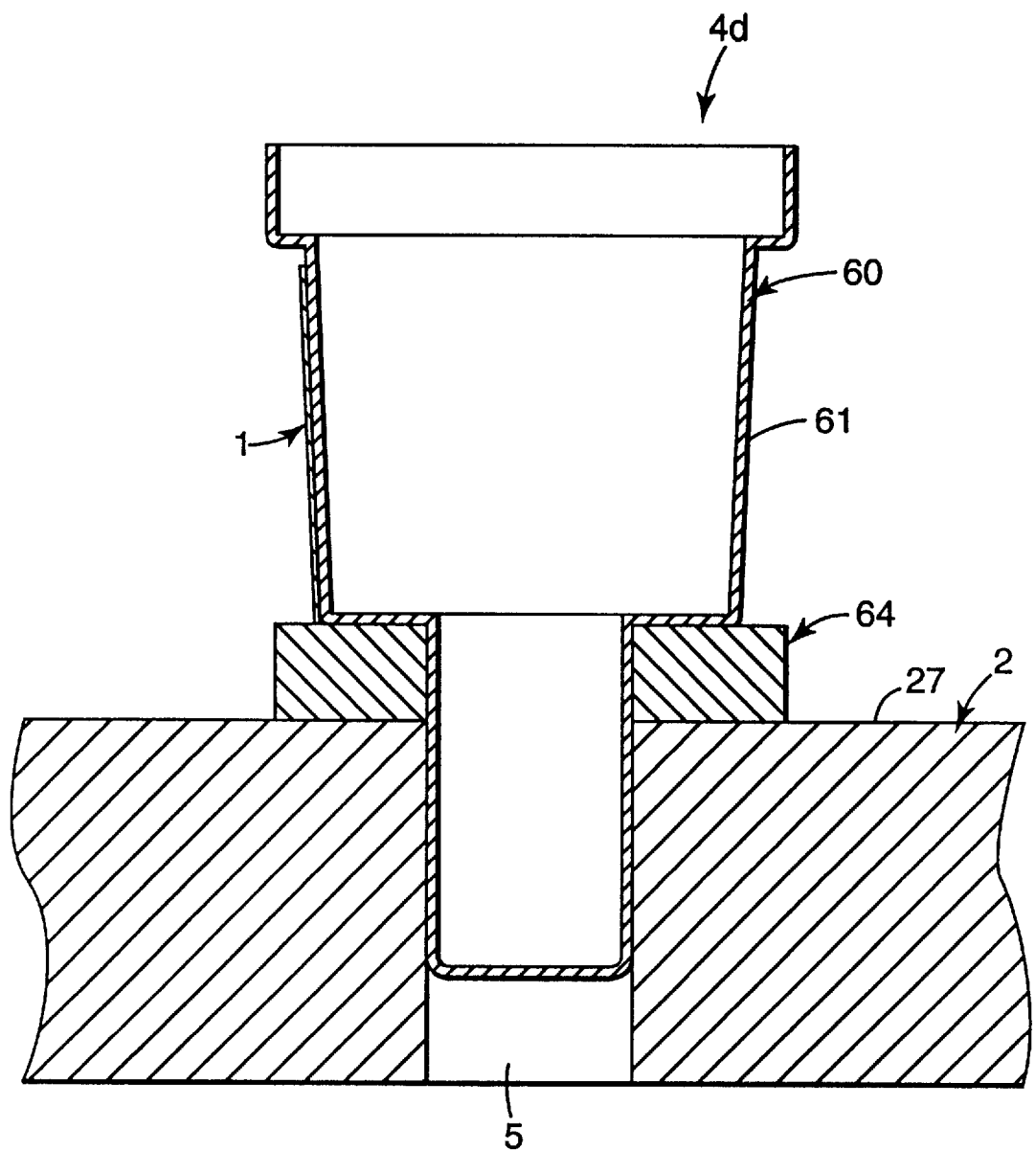
FIG. 6 is a cross sectional view of a fifth embodiment of a main tape guide post for guiding the lower edge of a magnetic recording tape according to the present invention.

FIG. 6 portrays a fifth embodiment of a main guide 4d, wherein surface 61, which contacts a major surface of tape 1, is not a cylinder of constant diameter, but is rather a tapered cylinder 60 having a smaller diameter at its lower end, near guide washer 64. Tapering surface 61 helps steer the tape 1 into engagement with the guide washer 65. It has been found that tapering surface 61 can, when used appropriately, also provide more uniform tape tension in the transverse direction.

It will be appreciated that while the hollow shell portions of main 30 guide 4, 4a, 4b, 4c are portrayed as being axisymmetric circular cylinders, cross sectional shapes other than cylinders may be used. Axisymmetric cylindrical shapes have the advantage, however, of not requiring a rotational orientation step during assembly.

Figure 7:
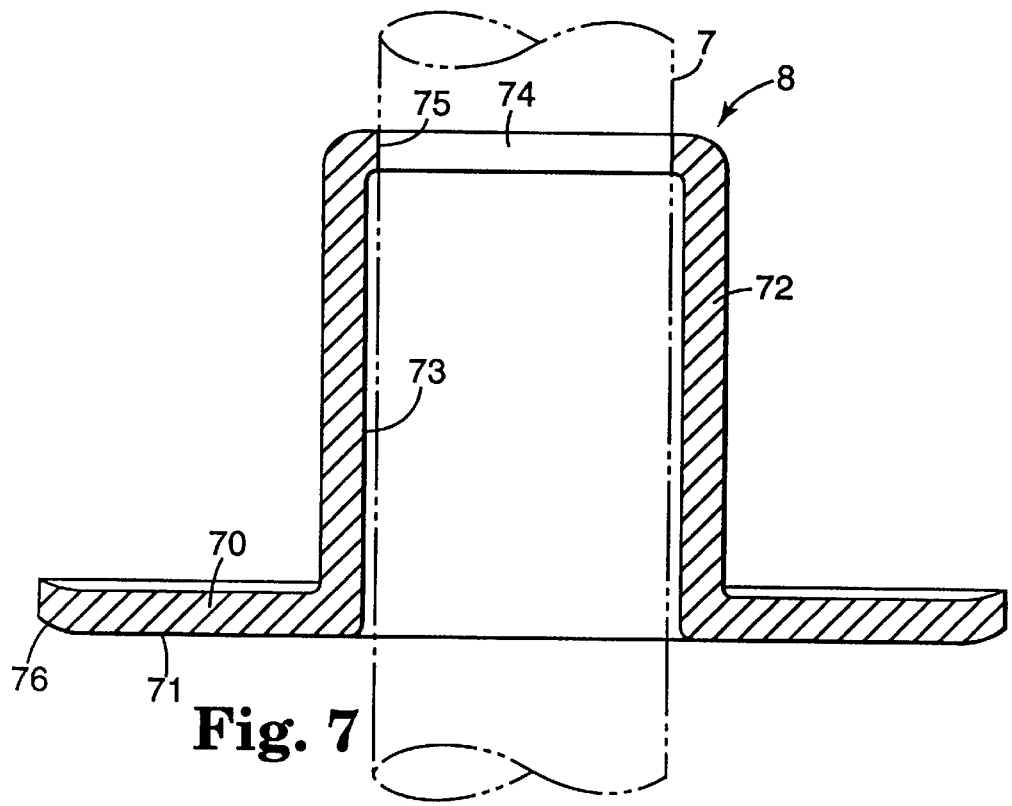
FIG. 7 is a cross sectional view of a first embodiment of a tape guide ferrule for guiding the upper edge of a magnetic recording tape according to the present invention.

Referring to FIGS. 1 and 7, upper guide ferrule 8 is shown in cross section. Guide ferrule 8 has a flange portion 70 having edge guide surface 71, a cylindrical portion 72 having inner cylindrical surface 73, and hole portion 74 having cylindrical interference surface 75. It is preferred that the diameter of interference surface 75 be slightly less than the diameter of guide pin 7, and that the diameter of cylindrical surface 73 be equal to or very slightly greater than the diameter of guide pin 7. Risk of tape edge damage is reduced by providing turned up portion 76, which smoothes the entrance of tape 1 into the region of guide 6. In use, guide ferrule 8 is installed onto guide pin 7 by placing cylindrical surface 73 over pin 7 and sliding it down onto pin 7 to a predetermined position. During the assembly process, interference surface 75, being of a slightly smaller diameter than pin 7, is brought into interference engagement with pin 7, thereby providing a gripping action on pin 7 to hold ferrule 8 in a fixed position relative to pin 7 with sufficient strength to preclude movement of ferrule 8 relative to pin 7 during transport of tape 1 in directions 13, or during other handling of the apparatus.

Figure 8:
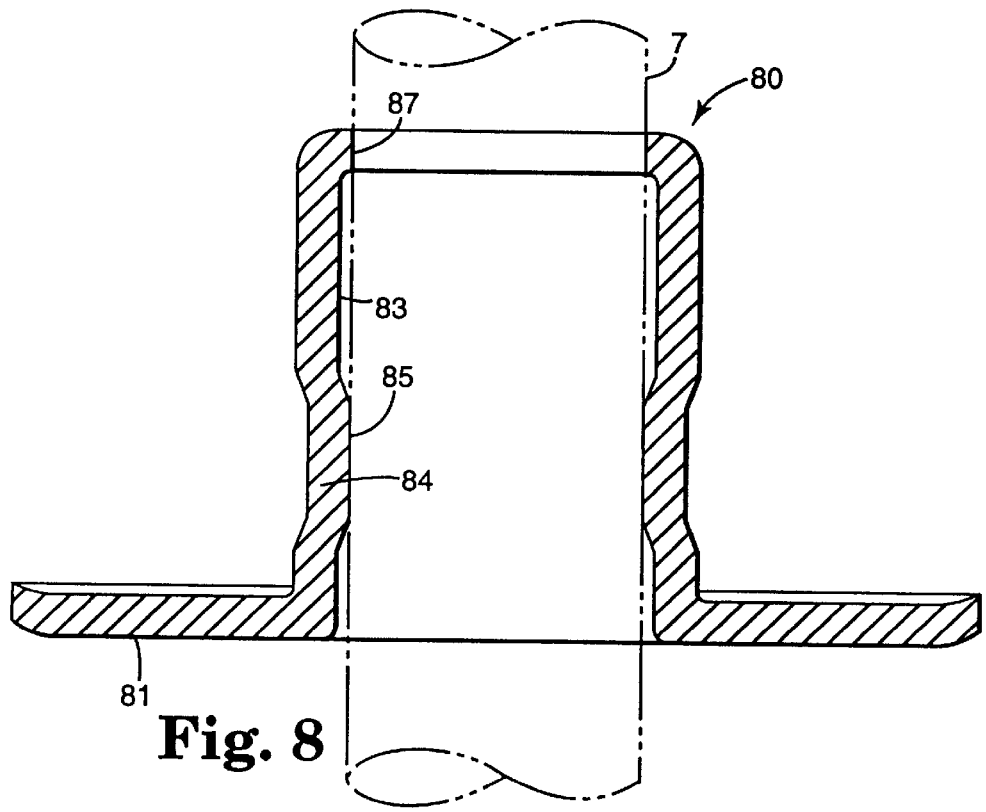
FIG. 8 is a cross sectional view of a second embodiment of a tape guide ferrule for guiding the upper edge of a magnetic recording tape according to the present invention.

FIG. 8 portrays an alternative embodiment 80 of a guide ferrule, wherein inner cylindrical surface 83 is provided with interference indentations 84, which define an inner cylindrical surface 85 having a diameter slightly less than the diameter of guide pin 7, thereby providing an interference fit which serves to grip 7 so as to hold it in a fixed position. In addition, interference surface 87 may be provided with a smaller diameter than pin 7 for additional gripping of pin 7.

Figure 9:
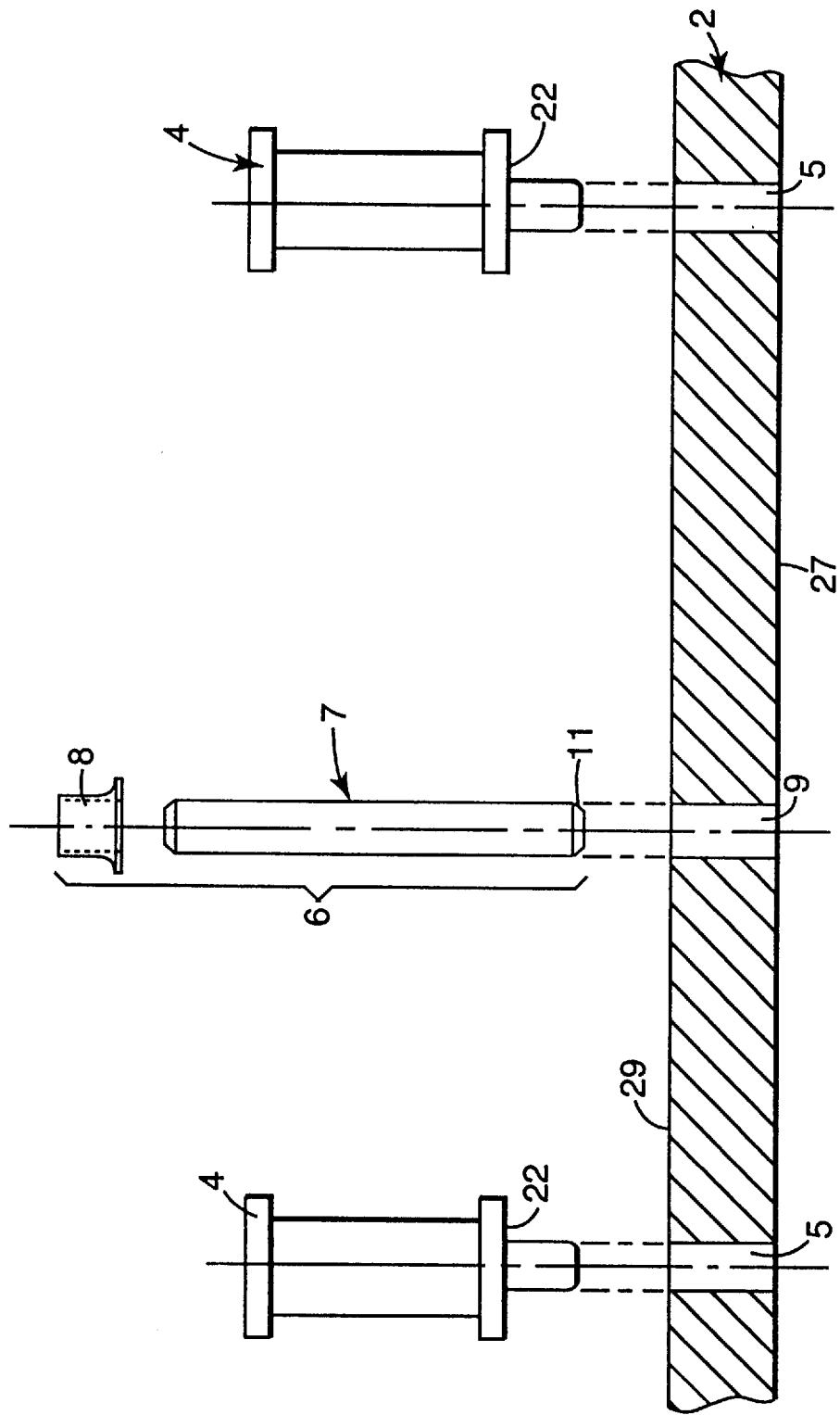
FIG. 9 is an exploded view in partial section of main tape guides and tape upper edge guides in relation to a baseplate according to the present invention.

Pin 7 is preferably a section of commercially available smooth steel or other metal rod, cut to suitable lengths. Assembly can be aided by providing chamfers or radii 11 on each end of pin 7, as shown in FIG. 9. Alternative configurations for pin 7 might include tubular or shell structures, suitable nonmetallic materials, or steps at the top and bottom to provide accurate corner mating with the ferrule and/or baseplate.

Materials suitable for deep drawn parts 8, 20, 30, 40, 50, 60, and 80 include metals which are available in thin sheets and are suitable for forming by deep drawing. In applications where moderate speeds and edge guiding forces are involved, stainless steels have been found suitable. In cases wherein higher thermal conductivities are needed, beryllium copper, phosphor bronze, silicon-nickel bronze and various types of brass are the preferred metals for the portion of main guide 4 which contacts a major surface of tape 1. Because the deep drawn parts are relatively thin shells, less material is required than would be required for solid parts performing the same function. This relaxes cost constraints which might otherwise exist. It has also been found useful to apply plating or other suitable coatings to deep drawn parts after forming. A particularly useful combination of materials is copper plated with zinc. Yet another possibility, especially with zinc, is to thin-wall die cast the guides.

Materials suitable for guide washers 22, 34, and 64 include materials which can be formed into washers or rings and which are abrasion resistant. It is also desirable that the materials have suitable thermal conductivity if high tape transport speeds are to be used.

Figure 10:
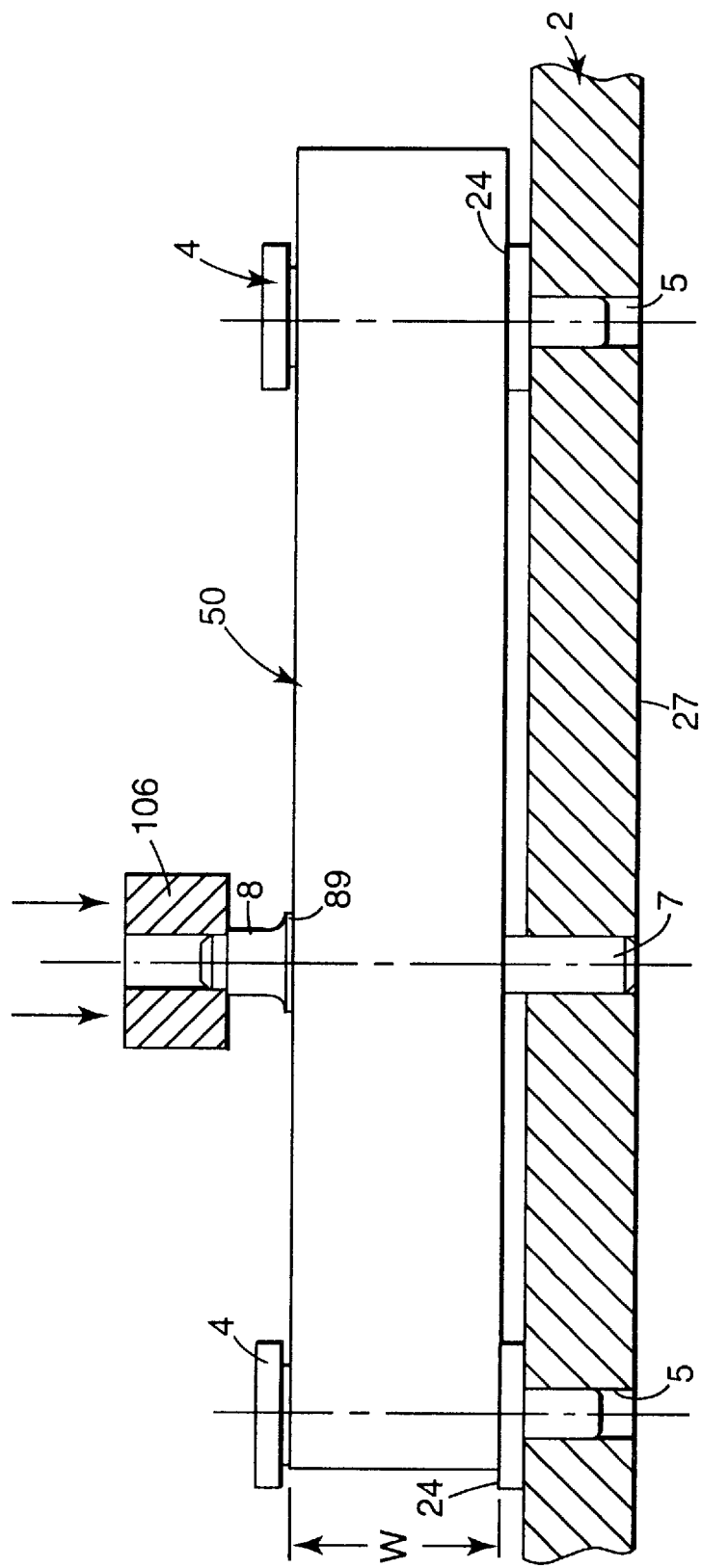
FIG. 10 is an elevational view in partial section of an apparatus for positioning the upper edge tape guide ferrule according to the present invention.

Referring to FIG. 9, assembly of the tape guide apparatus according to the present invention can be performed by first pressing main guides 4 into holes 5 of baseplate 2, until lower flange surfaces 22 engage upper surface 29 of baseplate 2, and pressing guide pin 7 into hole 9 of baseplate 2. The depth to which pin 7 is pressed into hole 9 is not critical, provided pin 7 is pressed sufficiently far into hole 9 to hold it in a reliably fixed position, and provided, on the other hand, that pin 7 does not protrude excessively beyond surface 27 of baseplate 2. A preferred final step in assembling the tape guide is shown in FIG. 10, wherein gauge bar 50 has been placed into engagement with lower tape guide surfaces 24. Upper edge guide ferrule 8 is placed over guide pin 7 and pressed, by means of pressing device 106, into engagement with gauge bar 50. Gauge bar 50 can be a rigid bar having width W which is slightly less than width $T_w$ of tape 1.

It has been found that suitable values for the difference between $T_w$ and W range between about –0.025 mm (–0.001 inches) (i.e., a slight gap) to about 0.076 mm (0.003 inches), and optimally is about 0.025 mm (0.001 inches). It has been found that if the width of gauge bar 50 is only 0.025 mm (0.001 inches) less than the width of the tape to be guided by the apparatus (that is, so that the distance W from a line through lower edge guide surfaces 24 to the upper edge guide surface 89 is less than the width of the tape by 0.025 mm), an interference of this amount will be provided between the edge guides and the tape, improved tape guiding results. Since normal tape slitting tolerances allow tape width to vary by about 0.0013 mm (0.0005 inches), a slightly greater interference between the tape guides and the tape is preferred, to assure that some interference always occurs. It has been found, however, that an interference of 0.076 mm (0.003 inches) sometimes causes worsened tape guiding and edge wear. While no specific reason for this worsening has been found, it is suspected that the tape is unable to negotiate the excessively weaving path caused by the this level of tape guide interference, and that this leads to buckling of the tape due to excessive transverse force being applied to it by the guides.

Figure 11:
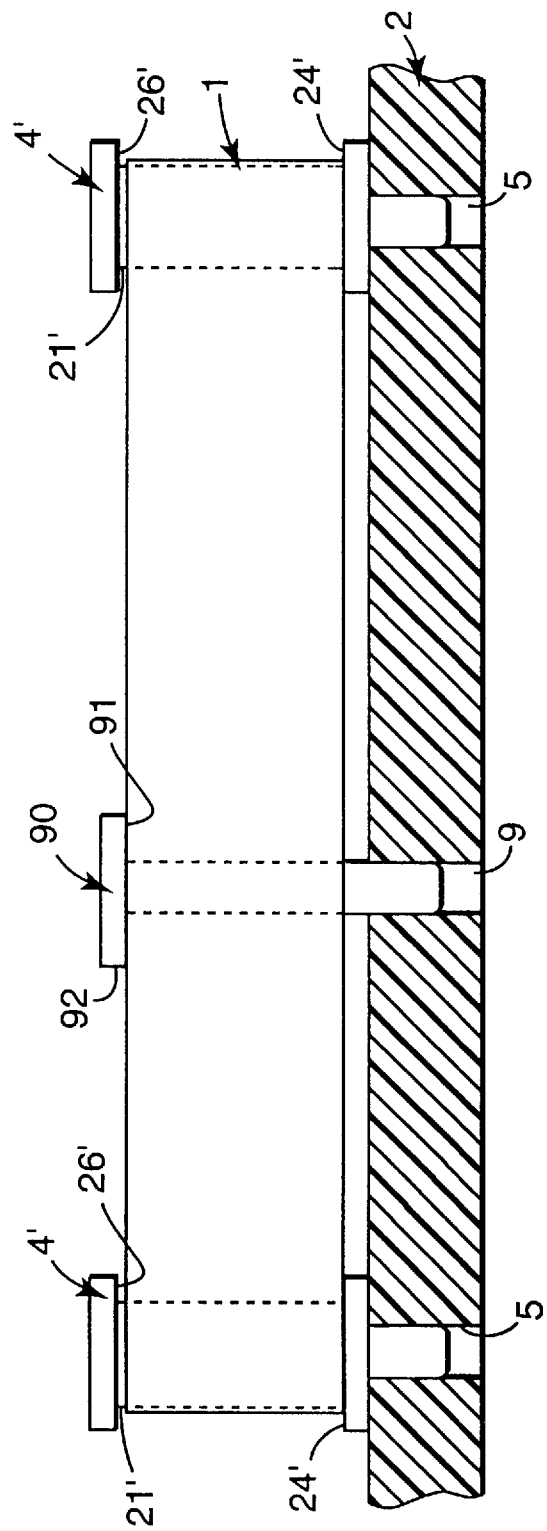
FIG. 11 is an elevational view in partial section of a preferred embodiment of a tape guiding apparatus according to the present invention.

FIG. 11 shows an alternative embodiment of the present invention using nail-like pins 4', 90. Instead of being formed as ferrules on a machined pin, the entire structure of the pin (including the shoulders) is machined. It has been found that with sufficient control during machining, such a structure can provide very good surfaces for engagement with the tape. In this structure, the guide surface 91 for the intermediate guide is formed by the underside of the head 92 of the nail-like pin 90. The guide surface 24' and guide flange 26' project out from the pin portion 21' of the main guides 4' much in the fashion of the heads on a double-headed nail. As with the metal shell structure, the position of the guide surface 24' is the critical surface for edge guiding of the tape 1. The guide flange 26' is provided merely to prevent the tape from coming off of the main guides 4', and preferably should be spaced somewhat from the tape 1 to avoid engagement with the tape 1 under normal circumstances.

Figure 12:
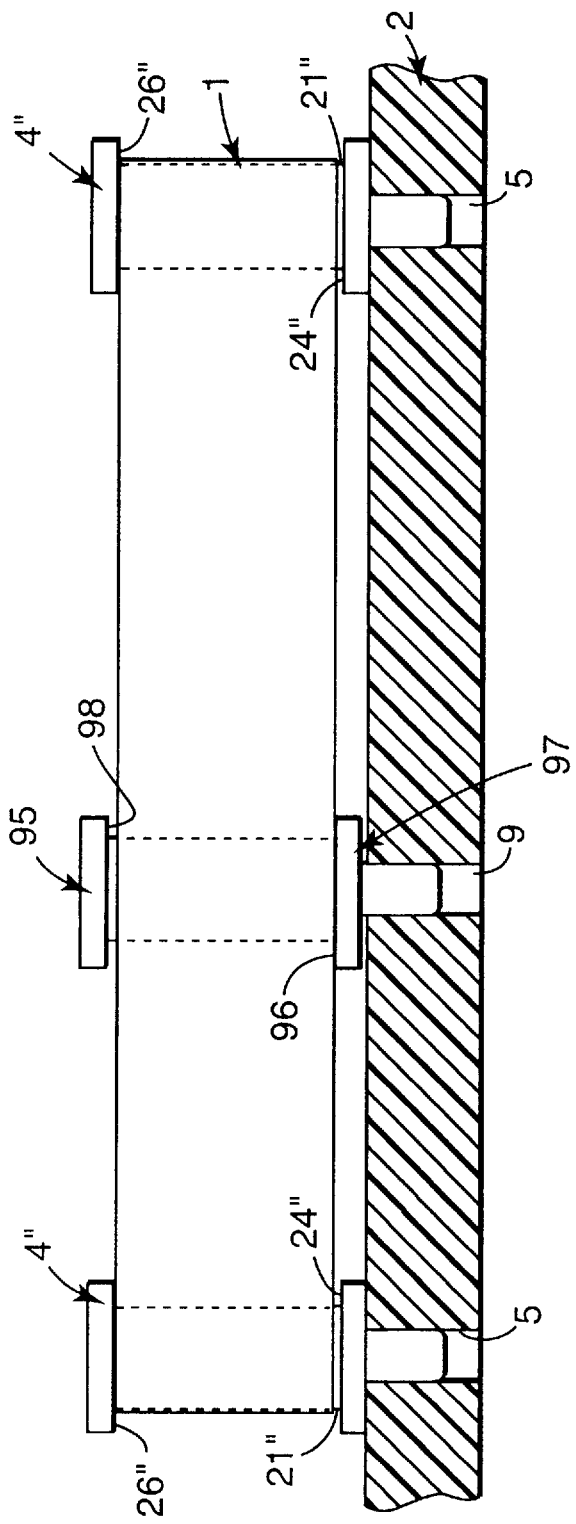
FIG. 12 is an elevational view in partial section of a preferred embodiment of a tape guiding apparatus according to the present invention.

FIG. 12 is a slight variation on FIG. 1. In this embodiment, the third guide pin 95 is also double-headed, and the tape 1 is positioned by guiding between the lower surface 96 of the center pin 97 and the upper guide flanges 26" of the main guides 4". Of course, with this structure accuracy in positioning is needed between guide flanges 26" and lower surface 96.

While the pins in FIGS. 11 and 12 are shown as machined from a single piece, they could instead be formed as two pieces. In this design, the pin preferably is stepped and a washer or ferrule rests against the step to form the head. Alternatively, the washer or ferrule position is adjusted along the length of the pin, as with the ferrules in the embodiments of FIGS. 1–10. This design has all of the same potential material selection advantages as the prior embodiments. As a further modification, the guide flanges 4', 24", 95 which do not contact the tape 1 could be omitted if desired.

The adjustment process when using a nail-like pin is essentially similar to the process in FIG. 10 using the pin and ferrule structure. The difference is that exact position of the relevant shoulders is then controlled by adjusting the amount to which the pins are inserted into the baseplate, rather than adjusting the position of the ferrule on the pin. If the pin itself is a stepped pin with the head formed by a washer or ferrule, the adjustment process would be even closer to the ferrule adjustment process.

Figure 13A:
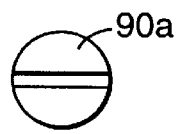
FIGS. 13a through 13j show various embodiments of pin end and baseplate modifications to reduce the force required to insert the pins into the baseplate.

In addition, it has been found that the force required to insert a conventional round pin may conflict with the desire for high precision when inserting and adjusting a nail-like pin. It therefore is preferable to modify the end of the pin in some fashion to reduce the force needed to insert the pin. Examples are shown in FIGS. 13*a* through 13*j*. FIG. 13*a* shows an embodiment in which the end of the pin 90*a* is slotted.

Figure 13B:
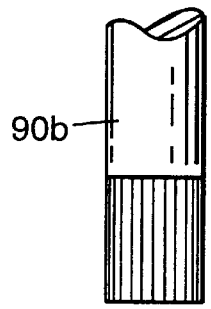
Figure 13D:
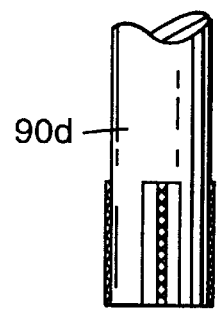
Figure 13C:
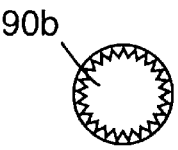
Figure 13E:
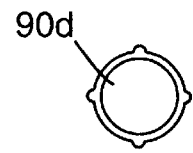
Figure 13H:
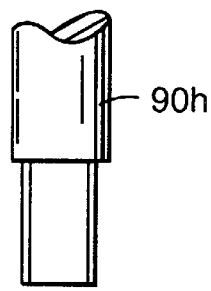
Figure 13F:
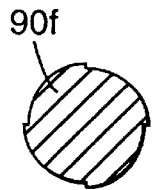
Figure 13G:
Figure 13I:
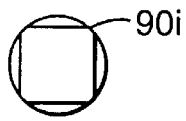
Figure 13J:
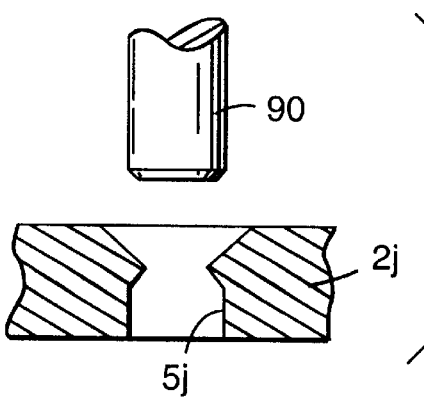

FIGS. 13*b* and 13*c* show an embodiment in which the end of the pin 90*b* is splined or knurled. FIGS. 13*d*–13*g* show embodiments in which the end of the pin 90*d*, 90*f*, 90*g* is crimped. FIGS. 13*h* and 13*i* show an embodiment in which the end of the pin 90*h* is polygon turned. Alternatively, as shown in FIG. 13*j*, a normal round pin 90 could be used and the bore 5*j* in the baseplate 2*j* could be modified. While any shape could be used, most effective bore would probably be a polygon shaped hole.

While it is a common approximation to assume that tape 1 travels in directions 13, parallel to baseplate 2, as shown in FIG. 1, with the tape in a plane perpendicular to baseplate 2, it is clear that deviations from this path occur. The use of alternate edge guidance, for example, can introduce significant tape path deviations. Tilting of tape guides and tape reel axes can also introduce deviations.

Tape path deviations can have two components—tape slope and in-plane bow. Either of these can occur at any portion of the tape path from one hub to the other. Both should be considered when determining appropriate values for W relative to $T_w$. In particular, it should be noted that tape bow could cause W to be larger than $T_w$.

Figure 14:
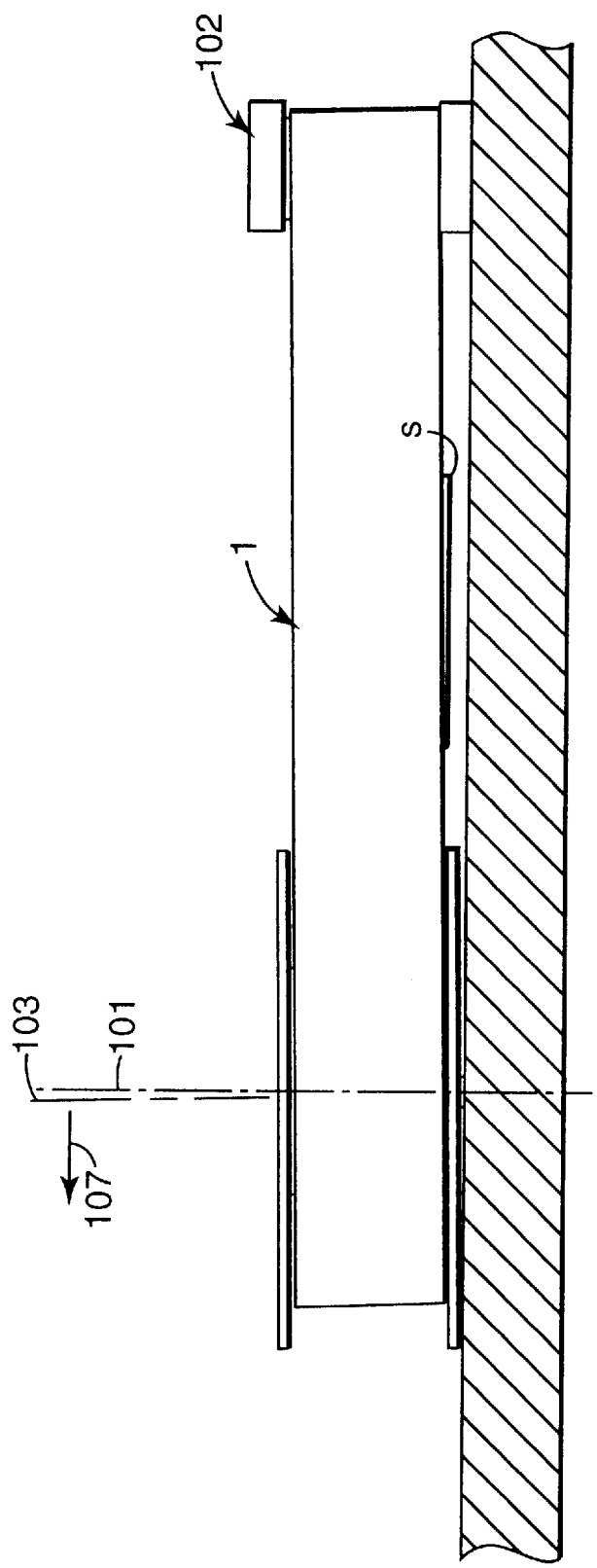
FIG. 14 is an elevational view in partial section of a portion of a tape path from a tape reel to a tape guide wherein the tape has a positive tape slope produced by tilting of a reel axis.
Figure 15:
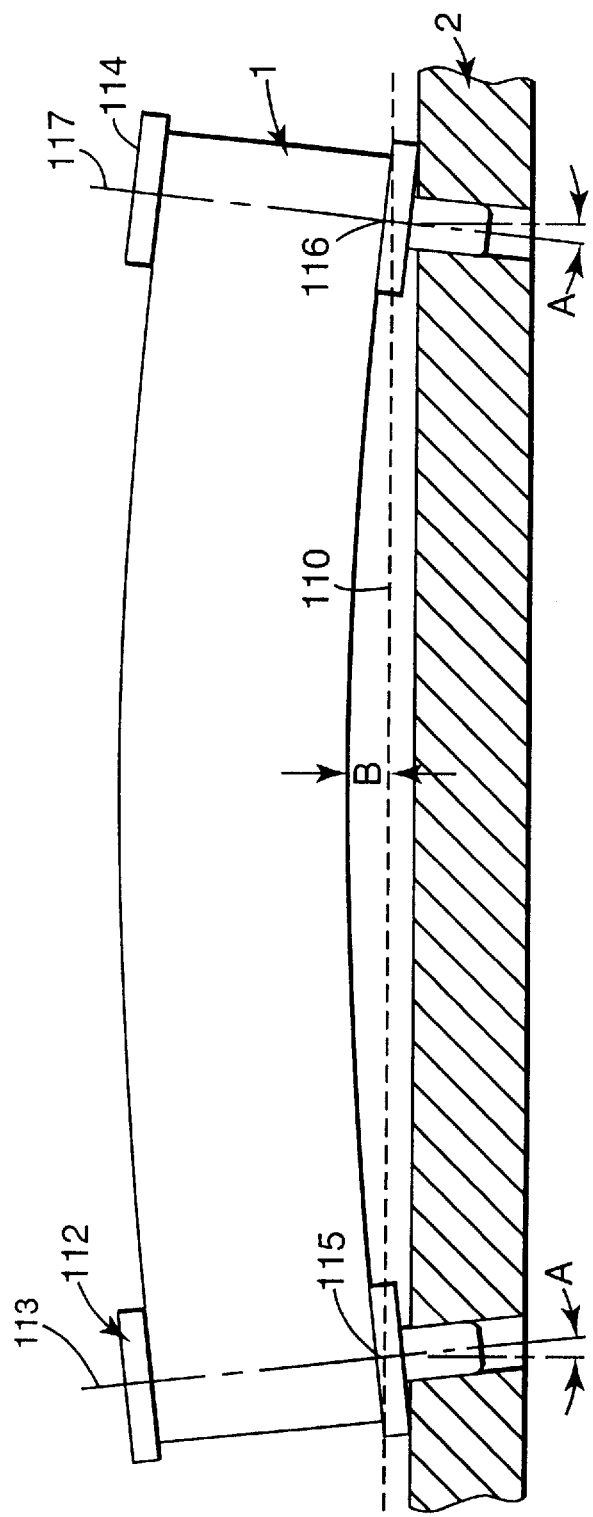
FIG. 15 is an elevational view in partial section of a portion of a tape path wherein the tape has a positive in-plane bow (greatly exaggerated in the drawing) produced by tilting of the tape guides in opposite directions.

An example of tape slope is shown, to a somewhat exaggerated degree, in FIG. 14, while in-plane bow (also exaggerated) is shown in FIG. 15. In FIG. 14, axis 103 of reel 101 is tilted in tilt direction 107 away from perpendicularity to baseplate 2, thereby imparting slope S to tape 1. Tilt direction of an axis will hereinafter be taken to be the direction in which the free end of an axis is moved relative to the fixed end in producing the tilt. Slope S will be taken as positive from reel 101 to guide 102 if the distance of the tape from baseplate 2 increases from reel 101 to guide 102. Tilting of axis 103 may occur due to manufacturing tolerance, or may be produced intentionally.

A highly exaggerated case of in-plane bow is shown in FIG. 15, wherein tape 1 bends in the plane of its major surfaces. Such bending can be measured by displacement B of the point of maximum deviation of the tape from undeviated, straight line position 110 of tape 1. In-plane bow between two reference points, for example points 115 and 116 in FIG. 15, will be taken as positive if the portion of the tape between the two reference points is at a greater distance from baseplate 2 than is a straight line between the two points. In-plane bow may be induced by tilting of axes 113 and 117 of guides 112 and 114 in generally opposite directions from perpendicular, so that, for example, axis 113 of guide 112 and axis 117 of guide 114 in FIG. 15 each deviate from the perpendicular axis by angle A. It will be appreciated that tilt angle A need not be the same for both pins.

It has been found that while tape slope and in-plane bow can result from naturally occurring tolerances in orientation of tape reels, guides, and other members which may affect tape path, these phenomena can also be used, when produced in a controlled manner, to more accurately position the tape path relative to a transducer and to equalize tape tension across the tape so as to provide more uniform tape contact with a transducer. In particular, tape slope and/or in-plane bow can be used to bias the tape toward one side or the other of the tape guide, so that the tape edge will engage the corresponding edge guide.

Figure 16:
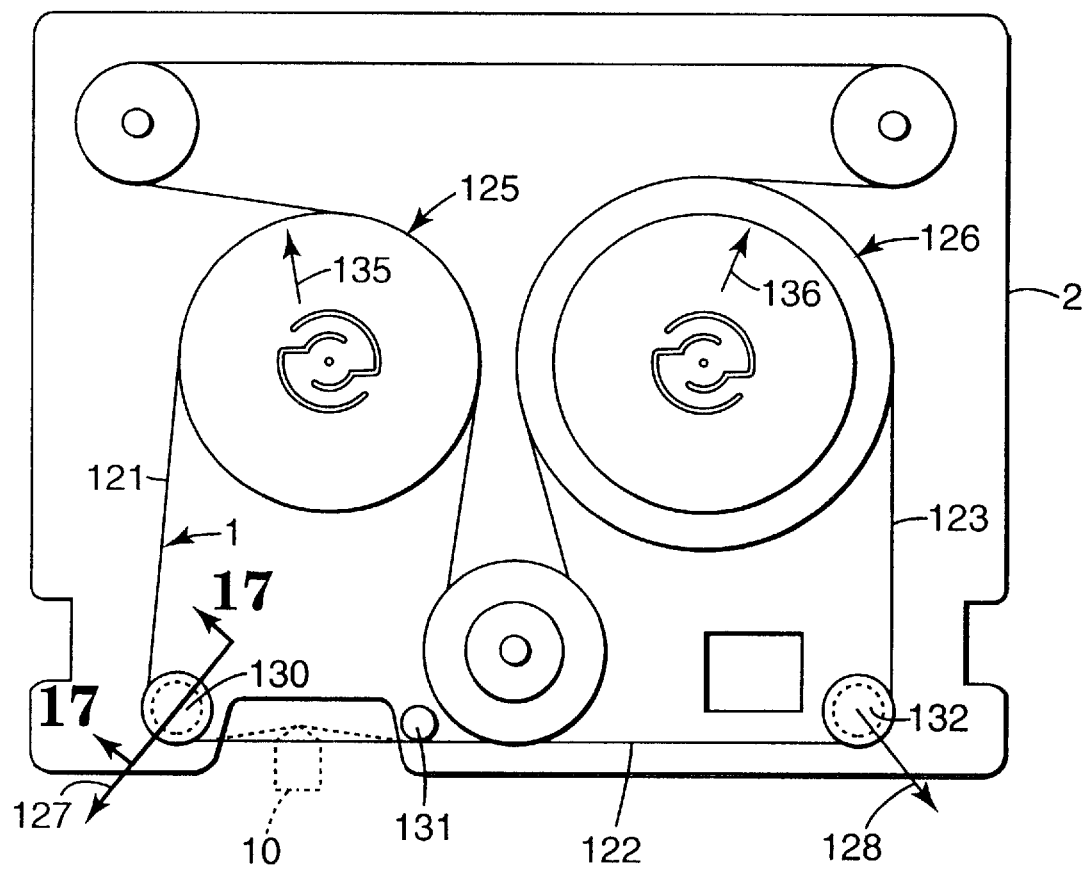
FIG. 16 is a plan view of the tape path in a data cartridge which uses tape guides according to the present invention.

Referring to FIG. 16, which portrays a tape path for a data cartridge, tape 1 is guided past head 10 in a precisely repeatable manner by means of alternate edge guidance provided by guides 130, 131, and 132, while maintaining acceptable transverse uniformity of tape tension in the region of head 10 and uniformity of winding of tape 1 onto reels 125 and 126. The axis of reel 125 is tilted in direction 135, the axis of reel 126 is tilted in direction 136, guide 130 is tilted in direction 127, and guide 132 is tilted in direction 128. Tilt direction 136 is preferably chosen to be approximately parallel to portion 123 of tape 1 at midtape position, which is the point of tape travel wherein approximately half of tape 1 is wound onto reel 125, and tilt direction 135 is preferably chosen to be approximately parallel to portion 121 of tape 1 at midtape position. Tilt direction 127 is chosen to approximately bisect the angle between tape portions 121 and 122 at midtape position, and tilt direction 128 is chosen to approximately bisect the angle between tape portions 122 and 123 at midtape position. Main guides 130 and 132 are preferably of the type portrayed in FIGS. 2, 3, 4, 5, or 6, while intermediate guide 131 is preferably of the sliding ferrule type portrayed in FIGS. 1 and 9.

Tilting the axis of reel 125 in direction 135, while tilting guide 130 in direction 127, imparts to tape portion 121 a positive slope from reel 125 to guide 130, as well as a positive in-plane bow. Tilting guide 132 in direction 128 imparts, in combination the tilt of guide 130 in direction 127, a positive in-plane bow to tape portion 122. Tilting reel 126 in direction 136, imparts, in combination with the tilt of guide 132 in direction 128, a positive in-plane bow and positive slope from reel 126 to guide 132.

The positive in-plane bow in tape portion 122 enables tape portion 122 to be guided by lower edge guides 130, 132 and upper edge guide 131 without introducing excessive weave into the path traveled by tape portion 122. This can be done by making width W of gauge block 50 substantially equal to width $T_w$ of tape 1, thereby locating the tape guiding surface of upper edge guide 131 in such a position as to just straighten out the in-plane bow produced by the tilting of guides 130, 132. Stated another way, the negative in-plane bow imparted by upper edge guide 131 to tape 1 is superimposed upon an equal positive in-plane bow imparted to tape 1 by the tilting of guides 130 and 132, resulting in zero in-plane bow.

It has been found that tilting of tape reels and tape guides in the manner described above also has the effect of improving head to tape contact by adjusting and correcting crosstape tension nonuniformities. In the tape path portrayed in FIG. 16, straightening of the in-plane bow in portion 122 of the tape by downward urging of the tape by tape guide 131 would normally be expected to decrease the tension in the tape near the upper edge, relative to the lower tape edge. However, the tilting of guides 130, 132 outward, in directions 127, 128, respectively, has been found effective in tightening, that is to say increasing the tension, in the upper edge of the tape, thereby compensating for the tendency of guide 131 to decrease the tape tension. The precise amount to tilt needed can be determined by experimentation or by calculation, and the position of top edge guide 131 can be adjusted during manufacture to achieve maximum crosstape tension uniformity. Of course, when determining the actual amount of tilt, other factors may need to be considered as well, for example, tilt to compensate for nonuniformity of transverse tape tension.

Figure 17:
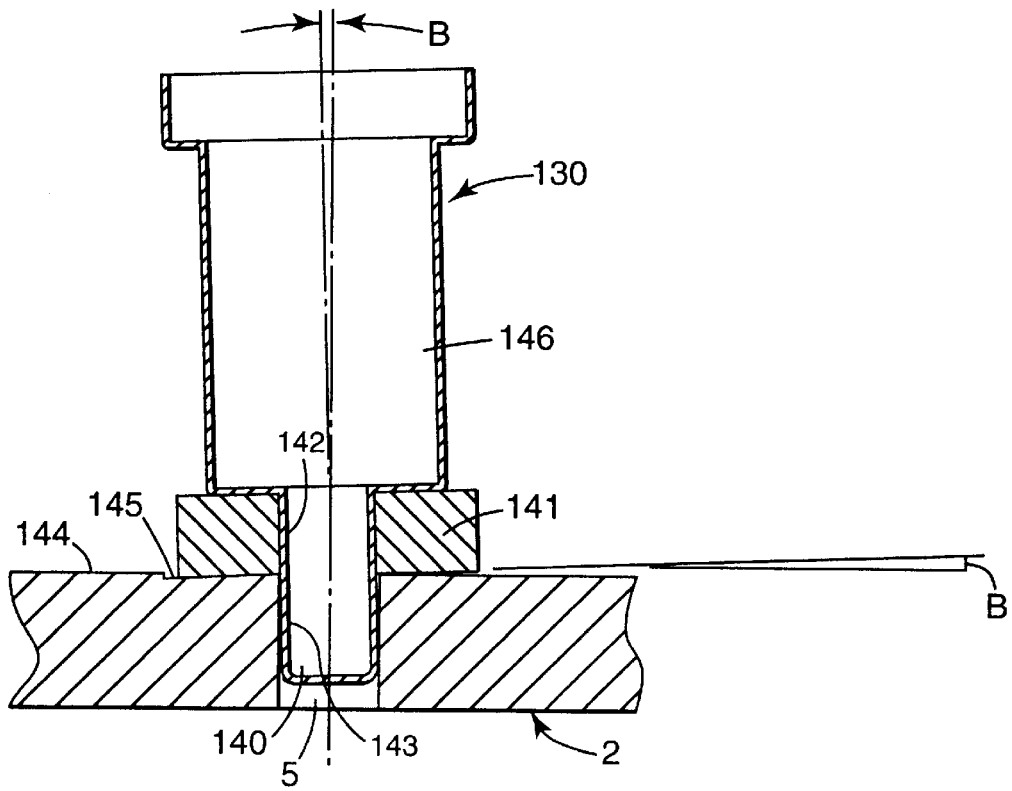
FIG. 17 is a cross sectional view of an embossed baseplate and tilted main tape guide.

Referring to FIG. 17, tilting of tape guide 130 can be accomplished by providing sloped embossed area 145 having slope B beneath lower edge guide washer 141. Embossing can be performed by, for example, pressing the end of a cylindrical tool having a circular cross section at a suitable orientation against surface 144 of baseplate 2. When a cylindrical tool is used, it is preferred that the tool have a larger diameter than the diameter of lower edge guide washer 141, that the contact surface of the tool impart a different surface texture to the contacted portion than that existing on surface 144, and that the cylindrical axis of the tool be oriented along the direction desired for the axis of tape guide 130.

Figure 18:
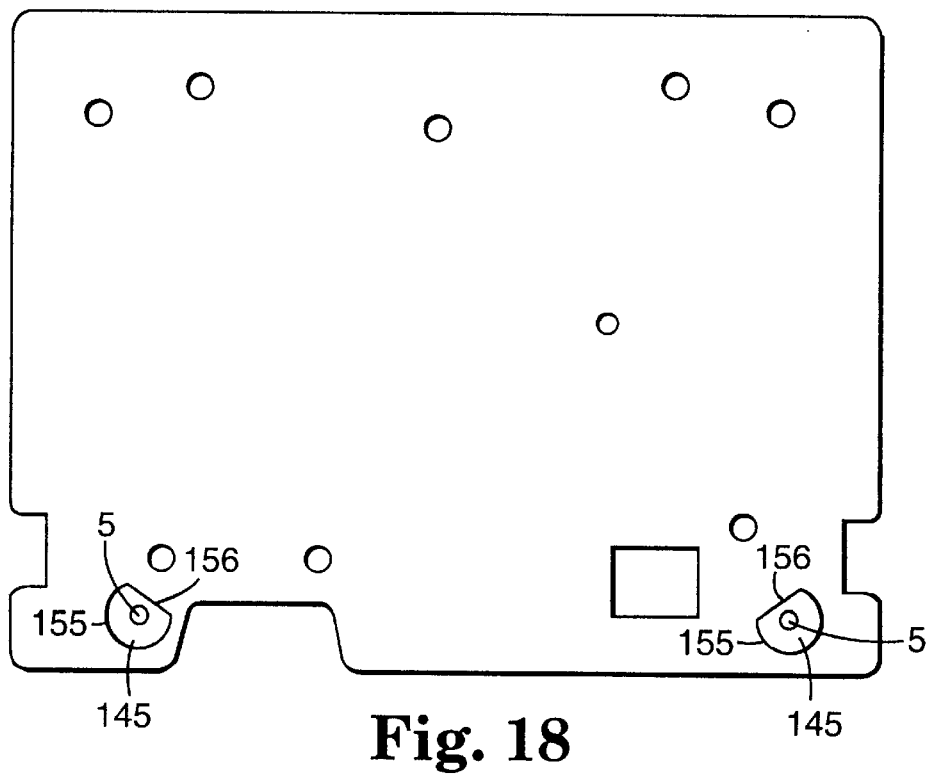
FIG. 18 is a plan view of an embossed baseplate showing an embossed area in the shape of a partial circle.

It is further preferred that the depth of embossing be less than that required for producing a full, impression of the tool. Referring to FIG. 18, orienting the cylindrical embossing tool in a direction coincident with the desired orientation of guide 130 and suitably limiting the depth of embossing produces slanted embossed portion 145, which approximates an incomplete circle bounded by a substantially circular edge portion 155 and blend line 156, wherein blend line 156 is the line at which slanted embossed portion 145 blends with top surface 144 of baseplate 2. Blend line 156 becomes visible if the surface texture of embossed slanted area 145 is different from that of surface 144. One advantage to limiting the depth of embossing is that the orientation of slanted area 145 can readily be determined by observation or measurement of the angle of blend line 156 relative to the baseplate. A second advantage is that the length of blend line 156 is a sensitive indicator of the depth of embossing, so that during manufacture, the embossing process can be monitored by visually observing or measuring the length of blend line 156.

Referring again to FIG. 17, during installation of main guide 130, lower edge guide washer 141 is pressed firmly down against slanted embossed portion 145, thereby producing a tilted guide having a precisely determined guide slope B. Since, in a preferred embodiment, guide portion 146 is a thin walled shell, post portion 140 can bend slightly to form portions 142 and 143, which meet at a slight angle, thereby allowing guide 130 to have tilt slope B. In a preferred embodiment, a suitable value of guide slope B should be about 0.001 to 0.005 mm/mm, and preferably about 0.002 mm/mm.

Figure 19:
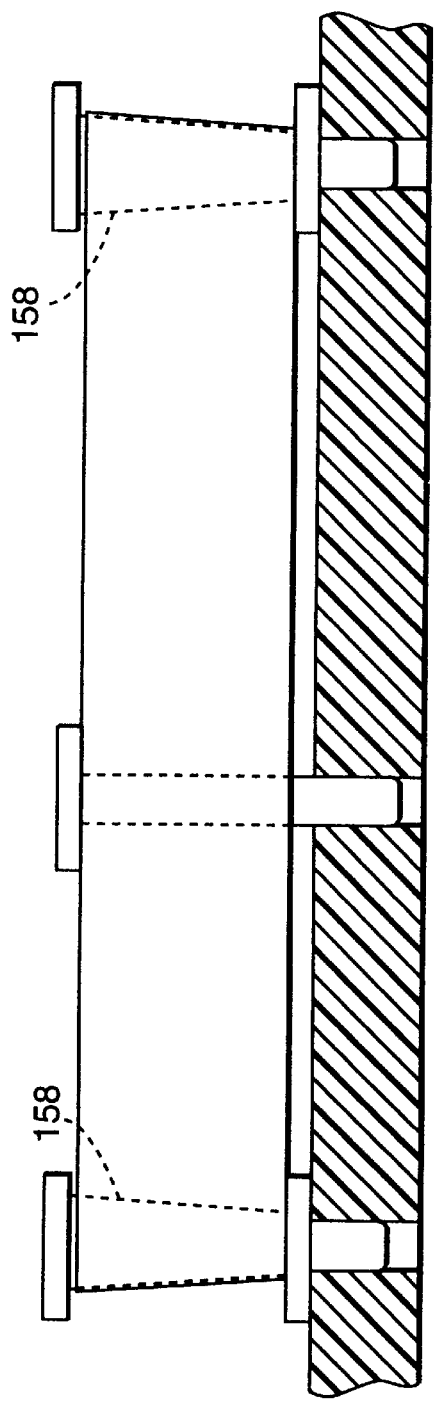
FIGS. 19 and 20 are elevational views in partial section of preferred embodiments of tape guiding apparatus according to the present invention.

Tilting of reels and guides is not the only available means for producing tape slope, in-plane bow and tape steering, or for equalizing tape tension in the transverse direction. In an alternative embodiment, in-plane bow in tape portion 122, tape tension equalization and tape steering can be achieved by tapering main guides 130 and 132, as portrayed in FIG. 6, wherein cylindrical portion 61 is of a smaller diameter at its lower end, near lower edge guide washer 64 than at its upper end. Alternatively, a similar tapered guide could be provided on a machined guide, as shown at 158 in FIG. 19. The amount of taper to be used can be determined by calculation or by experiment.

Figure 20:
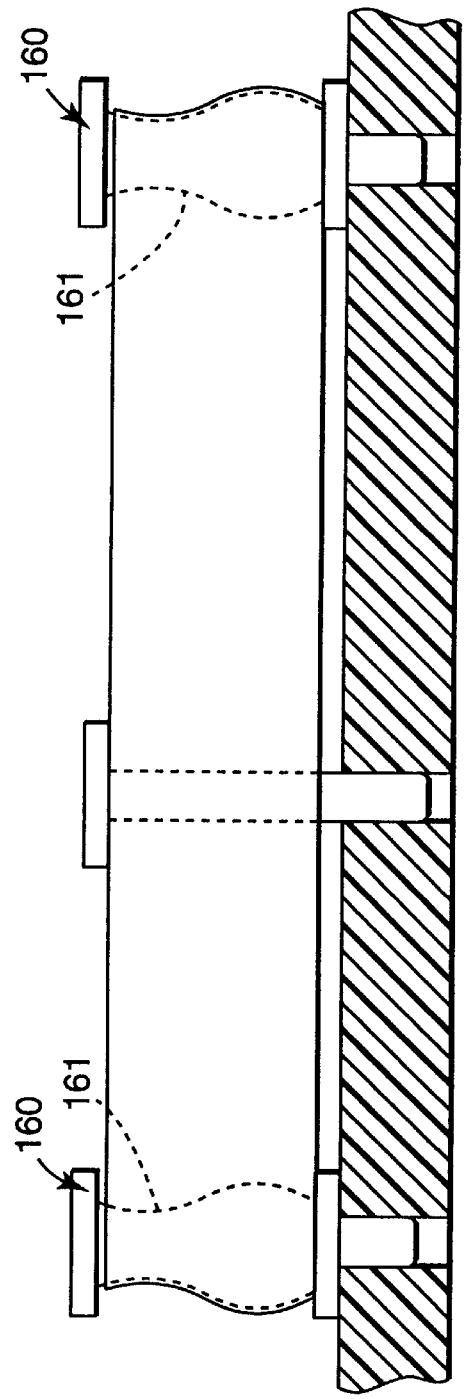

To generate precisely the forces desired at each transverse location across the tape, the corner guides may even be provided with a complex surface (shown in exaggerated form in FIG. 20). The main surface 161 of the guide 160 has a contoured shape to generate the precise forces desired. Such a structure would most readily be formed by a machining process, and it will also be appreciated that this structure has the advantage of allowing the pin to be inserted straight into the base plate instead of at an angle, which may allow for easier manufacturability. As with the embodiment of FIG. 6, the exact shape of the complex surface to be used can be determined by calculation or by experiment for a particular type of cartridge.

It will be understood that these exemplary embodiments in no way limit the scope of the invention. These descriptions are intended to provide specific examples of embodiments which clearly disclose the present invention, but other modifications of the invention will be apparent to those skilled in the art in view of the foregoing description. For example, a pin and ferrule third guide could be used with machined corner guides having a complex main surface. Similarly, a pin and ferrule third guide could be provided with a double head such as that shown for the nail-like head of FIG. 12. The positions of the guide engagement surfaces could also be inverted so that the third guide engages the bottom edge of the tape and the corner guides engage the top edge of the tape, for example, as in the embodiment shown FIG. 11 v. FIG. 12. Accordingly, the invention is not limited to the described embodiments or to the use of specific elements, dimensions, materials or configurations contained therein. All alternative modifications and variations of the present invention which fall within the spirit and scope of the appended claims are covered.

We claim:

1. A guidance system for tape in a cartridge, comprising:
   a) a baseplate:
   b) first and second hubs rotatably mounted to the baseplate;
   c) tape wound about and extending between the first and second hubs, the tape having first and second major surfaces, and first and second edges between the first and second major surfaces;
   d) a first guide having a first edge guide surface engaging the first edge of the tape to guide the tape;
   e) a second guide having a second edge guide surface engaging the first edge of the tape to guide the tape; and
   f) a third guide having a third edge guide surface engaging the second edge of the tape at a position along the tape longitudinally between the first and second guides to guide the tape, the third edge guide surface being at a predetermined distance from a line between the first and second edge guide surfaces, wherein the third guide comprises a pin having a head, the third edge guide surface being a surface of the head.

2. The guidance system of claim 1, wherein the pin forming the third guide has a single head, and the third edge guide surface is the lower side of the head.

3. The guidance system of claim 1, wherein the pin forming the third guide has a double head and the third edge guide surface is the upper side of the lower head.

4. A guidance system for tape in a cartridge, comprising:
   a) a baseplate;
   b) first and second hubs rotatable mounted to the baseplate;
   c) tape wound about and extending between the first and second hubs, the tape having first and second major surfaces, and first and second edges between the first and second major surfaces;
   d) a first guide having a first edge guide surface engaging the first edge of the tape to guide the tape;
   e) a second guide having a second edge guide surface engaging the first edge of the tape to guide the tape; and
   f) a third guide having a third edge guide surface engaging the second edge of the tape at a position along the tape longitudinally between the first and second guides to guide the tape, the third edge guide surface being at a predetermined distance from a line between the first and second edge guide surfaces;

wherein at least one of the guides comprises a pin mounted to the baseplate by insertion in a hole formed in the baseplate, and at least one of the hole and the end of the pin inserted into the hole is shaped to reduce the force required to insert the pin into the hole as compared to a round pin inserted into a round hole.

5. The guidance system of claim 4 wherein the end of the pin inserted into the hole is slotted, knurled, crimped or turned.

6. A guidance system for tape in a cartridge, comprising:
   a) a baseplate:
   b) first and second hubs rotatable mounted to the baseplate;
   c) tape wound about and extending between the first and second hubs, the tape having first and second major surfaces, and first and second edges between the first and second major surfaces;
   d) a first guide having a first edge guide surface engaging the first edge of the tape to guide the tape;
   e) a second guide having a second edge guide surface engaging the first edge of the tape to guide the tape; and
   f) a third guide having a third edge guide surface engaging the second edge of the tape at a position along the tape longitudinally between the first and second guides to guide the tape, the third edge guide surface being at a predetermined distance from a line between the first and second edge guide surfaces;

wherein at least one of the first and second guides comprises a pin having a head, and the edge guide surface of such guide is a surface of the head.

7. The guidance system of claim 6, wherein the pin forming at least one of the first and second guides has a double-head.

8. The guidance system of claim 7, wherein the pin has a double head and the edge guide surface is selected from the group consisting of the lower surface of the upper head and the upper surface of the lower head.

9. A method of making a guidance system for a tape cartridge, comprising:
   a) providing a baseplate;
   b) rotatably mounting first and second hubs to the baseplate;
   c) mounting a first guide to the baseplate, the first guide having a first edge guide surface;
   d) mounting a second guide to the baseplate, the second guide having a second edge guide surface;
   e) mounting a third guide to the baseplate, the third guide having a third edge guide surface; and
   f) adjusting the positions of the guides relative to the baseplate and each other to accurately position them in the baseplate such that the third edge guide surface is positioned a predetermined distance away from a line between the first and second edge guide surfaces, comprising the steps of:
      a) providing a gauge bar having first and second surfaces spaced a width W apart;
      b) positioning the first surface of the gauge bar to extend between the first and second edge guiding surfaces; and
      c) adjusting the position of the third edge guide surface to engage the second surface of the gauge bar.

10. The method of claim 9, wherein the tape to be used with the guidance system has a width $T_w$, and the width W is in the range of 0.025 mm greater than the width $T_w$ to 0.076 mm less than the width W.

11. A method of making a guidance system for a tape cartridge, comprising:
   a) providing a baseplate;
   b) rotatable mounting first and second hubs to the baseplate;
   c) mounting a first guide to the baseplate, the first guide having a first edge guide surface;
   d) mounting a second guide to the baseplate, the second guide having a second edge guide surface;
   e) mounting a third guide to the baseplate, the third guide having a third edge guide surface, wherein the third guide comprises a pin with an interference fit ferrule thereon, the third edge guide surface is on the ferrule; and
   f) adjusting the positions of the guides relative to the baseplate and each other to accurately position them in the baseplate such that the third edge guide surface is positioned a predetermined distance away from a line between the first and second edge guide surfaces, wherein the position of the third edge guide surface is adjusted by sliding the ferrule along the pin.

12. A method of making a guidance system for a tape cartridge, comprising:
   a) providing a baseplate;
   b) rotatably mounting first and second hubs to the baseplate;
   c) mounting a first guide to the baseplate, the first guide having a first edge guide surface;
   d) mounting a second guide to the baseplate, the second guide having a second edge guide surface;
   e) mounting a third guide to the baseplate, the third guide having a third edge guide surface, wherein the third guide comprises a pin with a head, the third edge guide surface is on the lower side of the head, the third guide is mounted to the baseplate by inserting it into a hole in the baseplate; and
   f) adjusting the positions of the guides relative to the baseplate and each other to accurately position them in the baseplate such that the third edge guide surface is positioned a predetermined distance away from a line between the first and second edge guide surfaces, wherein the position of the third edge guide surface is adjusted by adjusting the amount by which the pin is inserted into the hole.

13. A method of making a guidance system for a tape cartridge, comprising:
   a) providing a baseplate;
   b) rotatably mounting first and second hubs to the baseplate;
   c) mounting a first guide to the baseplate, the first guide having a first edge guide surface;
   d) mounting a second guide to the baseplate, the second guide having a second edge guide surface;
   e) mounting a third guide to the baseplate, the third guide having a third edge guide surface; and
   f) adjusting the positions of the guides relative to the baseplate and each other to accurately position them in the baseplate such that the third edge guide surface is positioned a predetermined distance away from a line between the first and second edge guide surfaces, wherein the third guide is positioned to maximize uniformity in the transverse tape tension.

14. A guidance system for tape in a cartridge, comprising:
   a) a baseplate;
   b) first and second hubs rotatably mounted to the baseplate;
   c) tape wound about and extending between the first and second hubs, the tape having first and second major surfaces, and first and second edges between the first and second major surfaces;
   d) a first guide having a first edge guide surface engaging the first edge of the tape to guide the tape;
   e) a second guide having a second edge guide surface engaging the first edge of the tape to guide the tape; and
   f) a third guide having a third edge guide surface engaging the second edge of the tape at a position along the tape longitudinally between the first and second guides to guide the tape, the third edge guide surface being at a predetermined distance from a line between the first and second edge guide surfaces;
   wherein the first and second guides include major support surfaces engaging the first major surface of the tape, the major support surfaces being angled relative to one another, and wherein the major support surfaces are tapered to provide the angling of the major support surfaces between first and second guides.

15. A guidance system for tape in a cartridge, comprising:
   a) a baseplate;
   b) first and second hubs rotatable mounted to the baseplate;
   c) tape wound about and extending between the first and second hubs, the tape having first and second major surfaces, and first and second edges between the first and second major surfaces;
   d) a first guide having a first edge guide surface engaging the first edge of the tape to guide the tape;
   e) a second guide having a second edge guide surface engaging the first edge of the tape to guide the tape; and
   f) a third guide having a third edge guide surface engaging the second edge of the tape at a position along the tape longitudinally between the first and second guides to guide the tape, the third edge guide surface being at a predetermined distance from a line between the first and second edge guide surfaces;
   wherein the first and second guides include major support surfaces engaging the first major surface of the tape, the major support surfaces being angled relative to one another, and wherein the major support surfaces have a shape that applies differing forces to the tape at each transverse location across the tape.

16. A guidance system for tape in a cartridge, comprising:
   a) a baseplate;
   b) first and second hubs rotatably mounted to the baseplate;
   c) tape wound about and extending between the first and second hubs, the tape having first and second major surfaces, and first and second edges between the first and second major surfaces;
   d) a first guide mounted to the baseplate and having a first edge guide surface engaging the first edge of the tape and a first major support surface engaging the first major surface of the tape to guide the tape;
   e) a second guide mounted to the baseplate and having a second edge guide surface engaging the first edge of the tape and a second major support surface engaging the first major surface of the tape to guide the tape, the major support surfaces of the first and second guides being angled relative to one another.

17. The guidance system of claim 16, wherein at least one sloped area is embossed into the baseplate beneath at least one of the first and second guides to angle the major support surfaces relative to one another.

18. The guidance system of claim 16, wherein the first and second guides mounted to the baseplate by being journalled on pins that are mounted to the baseplate, and at least one of the pins is inserted into the baseplate at an angle to angle the major support surfaces relative to one another.

19. The guidance system of claim 16, wherein at least one of first and second major support surfaces is tapered to angle the major support surfaces relative to one another.

20. The guidance system of claim 16, wherein the first and second main support surfaces are angled relative to each other sufficiently to bias the tape into engagement with the first and second edge guide surfaces.

21. The guidance system of claim 16, wherein the boundary of the sloped embossed area has a substantially circular portion and a substantially linear portion.

22. The guidance system of claim 16, wherein the major support surfaces are angled relative to the baseplate such that the portion of the tape between the first and second guides has an in-plane bow.

23. The guidance system of claim 22, wherein the in-plane bow is positive.

24. The guidance system of claim 16, wherein the major support surfaces are angled relative to the baseplate such that the portions of the tape between the first and second hubs and the first and second guides, respectively, have a slope.

25. The guidance system of claim 24, wherein the slope is positive.

* * * * *